United States Patent [19]
Fukuzawa

[11] Patent Number: 5,868,332
[45] Date of Patent: *Feb. 9, 1999

[54] RECORDING AND/OR REPRODUCING APPARATUS HAVING TAPE TENSION CONTROL MECHANISM WITH PLURAL BRAKING DEVICES

[75] Inventor: Keiichi Fukuzawa, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 726,922

[22] Filed: Oct. 7, 1996

Related U.S. Application Data

[62] Division of Ser. No. 230,619, Apr. 21, 1994, Pat. No. 5,636,805.

[30] Foreign Application Priority Data

Apr. 30, 1993 [JP] Japan .................................. 5-128363

[51] Int. Cl.$^6$ ............................. G11B 23/04; G11B 5/08
[52] U.S. Cl. ...................... 242/336; 242/334.6; 360/94
[58] Field of Search .............................. 242/336, 334.6, 242/421.8, 421.9, 422.8, 156.2; 360/94

[56] References Cited

U.S. PATENT DOCUMENTS

5,333,807  8/1994  Maehara et al. ................. 242/334.6

FOREIGN PATENT DOCUMENTS

358019763  2/1983  Japan .................................. 242/336

*Primary Examiner*—John Q. Nguyen
*Attorney, Agent, or Firm*—Robin, Blecker & Daley

[57] ABSTRACT

A recording and/or reproducing apparatus arranged to permit, each of a plurality of types of tape cassettes having different distances between reels to be selectively mounted on the apparatus by moving reel mounts with a reel mount moving mechanism and to allow a tape pulled out from the reels to travel while mechanically controlling the tension of the tape with a tape tension control mechanism in recording or reproducing information on or from the tape, includes a plurality of reel mount braking devices respectively provided for the plurality of types of tape cassettes, at least one of the braking devices being supported for translation relative to another of the braking devices and a coupling controller for selectively coupling one of the plurality of reel mount braking devices to the reel mount and a tape tension detecting means according to the type of the tape cassette mounted on the apparatus.

7 Claims, 20 Drawing Sheets

RECORDING AND/OR REPRODUCING APPARATUS HAVING TAPE TENSION CONTROL MECHANISM WITH PLURAL BRAKING DEVICES

This application is a division, of application Ser. No. 08/230,619, filed Apr. 21, 1994 U.S. Pat. No. 5,636,805.

BACKGROUND OF THE INVENTION

1. Field of the Invention

This invention relates to a recording and/or reproducing apparatus such as a VTR arranged to permit selective mounting of tape cassettes of different types having different distances between tape winding reels.

2. Description of the Related Art

Some VTRs which have heretofore been proposed and practicalized are arranged to permit selective mounting of tape cassettes of different types having different distances between reels for different purposes, namely, tape cassettes of two types. One is a large-sized cassette arranged to permit recording and/or reproduction over a long period of time. The other is a small-sized cassette arranged by attaching importance to portability. Generally, the VTR of this kind is arranged to permit the selective mounting of the tape cassette of any of the different types by moving and adjusting a pair of reel mounts to a pair of reels disposed within the cassette. For this arrangement, some tape tension control mechanisms also have been proposed.

According to a known tape tension control method which has been developed for the tape tension control mechanism, the pair of reel mounts are driven directly by different motors and the tape tension is controlled by individually controlling the two reel motors. This method has a good controllability for the tape tension. However, this method results in an expensive system and has not been used for ordinary home (or household) VTRs. For home VTRs, a method of mechanically controlling the brake torque of a tape-supply-side reel is employed in general.

A mechanical tape tension control mechanism which is popularly in use is described with reference to FIG. 1 as follows. A supply-side reel mount 204 is provided with a brake drum 244 which is disposed on the circumference of the supply-side reel mount 204. A magnetic tape 203 is pulled out from a supply reel which is not shown but is mounted on the supply-side reel mount 204. A tension arm 218 is swingable on a support shaft 217. A tension detecting guide 245 is provided at the fore end of the tension arm 218. A tension spring 216 urges the tension arm 218 to swing counterclockwise. One end of the tension spring 216 is secured to a support part 215 and the other end to a support part 250 which is provided on the tension arm 218. A brake band 213 is wrapped around the brake drum 244 and is arranged to generate a brake torque. One end of the brake band 213 is secured to a support part 211 and the other end to a support part 214 which is provided on the tension arm 218. Reference numerals 228 and 229 denote tape guides.

The operation principle of the tape tension control mechanism which is arranged as described above is as follows. The tape 203 which is pulled out from the supply reel mounted on the supply-side reel mount 204 reaches the tension detecting guide 245 via the tape guide 228 and is then led further to the tape guide 229 to form a predetermined tape path. After the tape path is thus formed, the magnetic tape 203 is taken up and wound around a takeup reel which is not shown. The tension arm 218 receives a clockwise moment from a tape tension applied to the tension detecting guide 245 and a counterclockwise moment from the spring 216. The tension arm 218 receives also a clockwise moment from the band tension of the brake band 213. The tension arm 218 takes repose in a position where the three moments balance. Meanwhile, the brake drum 244 on the supply-side reel mount 204 is tightened by the tension of the brake band 213 to generate a brake torque, which is applied to the supply reel.

When the tension of the tape 203 increases under the above-stated condition, the clockwise moment of the tension arm 218 increases. Then, the tensile force of the spring 216 increases and the band tension of the brake band 213 decreases in such a manner that the moments associated with the support shaft 217 serving as the rotational center of the tension arm 216 balance. When the band tension decreases, the brake torque generated at the brake drum 244 decreases to decrease the tape tension. With the tape tension decreased, the control is carried on to increase the tape tension by reversely performing the above-stated actions.

The balance of moments around the tension arm gives the following relation:

$$MS = FB\ LB + T\ LT \qquad (1)$$

wherein

MS: the moment of rotation caused by the spring

FB: the band tension

LB: an effective distance relative to the moment of rotation caused by the band tension about the center of swing of the tension arm T: the tape tension LT: an effective distance relative to the moment of rotation caused by the tape tension about the center of swing of the tension arm The balance of forces around the reel on the other hand give the following relation:

$$T\ R = RD\ FB \qquad (2)$$

wherein

R: the radius of a tape coil on the supply reel

RD: an effective radius relative to a brake torque caused by the band tension

Elimination of "FB" from the formula above gives the following formula:

$$T = MS / ((LB \cdot R/RD) + LT) \qquad (3)$$

Therefore, the tape tension T is controlled to obtain the value as mentioned above.

As apparent also from the formula (3), when the tape coil radius R on the reel changes, the tape tension T comes to change accordingly. Therefore, other design parameters MS, LB, RD and LT are set in such a way as to minimize the rate of the change.

However, when the conventional mechanical tape tension control mechanism which is generally arranged in the manner described above is applied to the VTR of the kind arranged to permit selective mounting of a large-sized cassette or a small-sized cassette, it brings about the following problems.

(i) Of the design parameters MS, LB, RD and LT which are necessary for control over the tape tension, the parameters RD and LT are limited by the dimensions of the small-sized tape cassette.

(ii) The tape coil radius R varies at a greater rate on the large-sized tape cassette than on the small-sized tape cassette. Therefore, in order to minimize the rate of variations of the tape tension T resulting from the variations of the tape coil radius, it is necessary to set the parameters RD and LT at large values and the parameter LB at a small value.

SUMMARY OF THE INVENTION

It is, therefore, an object of this invention to provide a recording and/or reproducing apparatus which is arranged to permit setting the above-stated parameters of mechanical tape tension control at optimum values according to a distance between the reels of each of the tape cassettes to be selectively mounted on the apparatus.

To attain this object, a recording and/or reproducing apparatus which is arranged as one embodiment of this invention to permit each of two different types of tape cassettes having different distances between reels to be selectively mounted on the apparatus by moving reel mounts with a reel mount moving mechanism and to allow a tape pulled out from the reels to travel while mechanically controlling the tension of the tape with a tape tension control mechanism in recording or reproducing information on or from the tape, comprises a detection member arranged to have a guide member abutting on the tape and to swing according to the tension of the tape, an urging member arranged to have one end thereof attached to the detection member and to urge the detection member to move in a predetermined direction, and a band-shaped member which is wrapped around a brake member disposed in a position corresponding to one of the reel mounts, the band-shaped member being arranged to have one end thereof attached to the detection member and to have a state of contact with the brake member controlled according to the movement of the detection member which swings according to the tension of the tape. The recording and/or reproducing apparatus is arranged such that the tape tension obtained under the control of the tape tension control mechanism can be expressed as T=MS/(LB·R/RD+LT), wherein T represents the tape tension, MS the moment of rotation caused by an urging force of the urging member with respect to the center of swing of the detection member, LB a distance from the center of swing of the detection member to a position where one end of the brake member is attached to the detection member, R the radius of a coil of the tape wound around the reel, RD an effective distance relative to a brake torque obtained by the band-shaped member and LT a distance from the center of swing of the detection member to the guide member. With the tape tension obtained by the tape tension control mechanism thus expressed as T=MS/(LB·R/RD+LT), two of the parameters LB, RD and LT are arranged to be fixed and the remaining one to be varied when the reel mounts are moved between different positions for each of the different types of tape cassettes.

A recording and/or reproducing apparatus which is arranged as a more practicable embodiment of this invention to permit each of a plurality of types of tape cassettes having different distances between reels to be selectively mounted on the apparatus by moving reel mounts with a reel mount moving mechanism and to allow a tape pulled out from the reels to travel while mechanically controlling the tension of the tape with a tape tension control mechanism in recording or reproducing information on or from the tape, comprises change-over means for changing over the radius of swing of a tape tension detecting guide of the tape tension control mechanism, and moving means for moving the tape tension control mechanism in such a way as to vary the radius of swing of the tape tension detecting guide according to the distance between the reels.

A recording and/or reproducing apparatus which is arranged as another embodiment of this invention to permit each of a plurality of types of tape cassettes having different distances between reels to be selectively mounted on the apparatus by moving reel mounts with a reel mount moving mechanism and to allow a tape pulled out from the reels to travel while mechanically controlling the tension of the tape with a tape tension control mechanism in recording or reproducing information on or from the tape, comprises a plurality of reel brake means respectively provided for the plurality of types of tape cassettes, and coupling means for selectively coupling one of the plurality of reel brake means to the reel mount and a tape tension detection means according to the type of the tape cassette mounted on the apparatus.

The above and other objects and features of this invention will become apparent from the following detailed description of embodiments thereof taken in connection with the accompanying drawings.

BRIEF DESCRIPTION OF THE DRAWINS

DETAILED DESCRIPTION OF THE PREFERRED EMBODIMENTS

Some of VTRs to which this invention is applied as preferred embodiments of it are described below with reference to the drawings.

Figure 1:
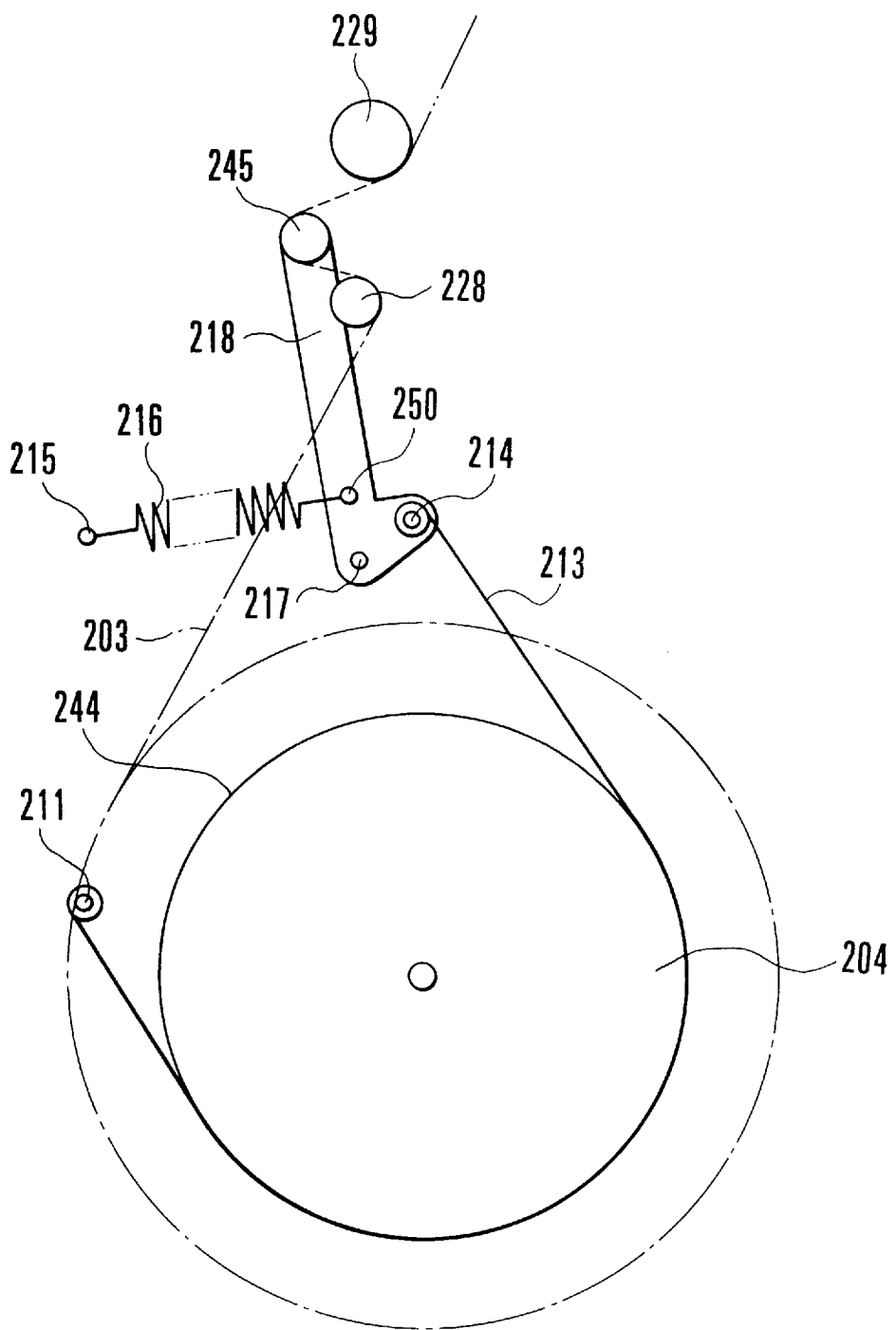
FIG. 1 is a plan view showing a mechanical tape tension control mechanism of the conventional apparatus.
Figure 2:
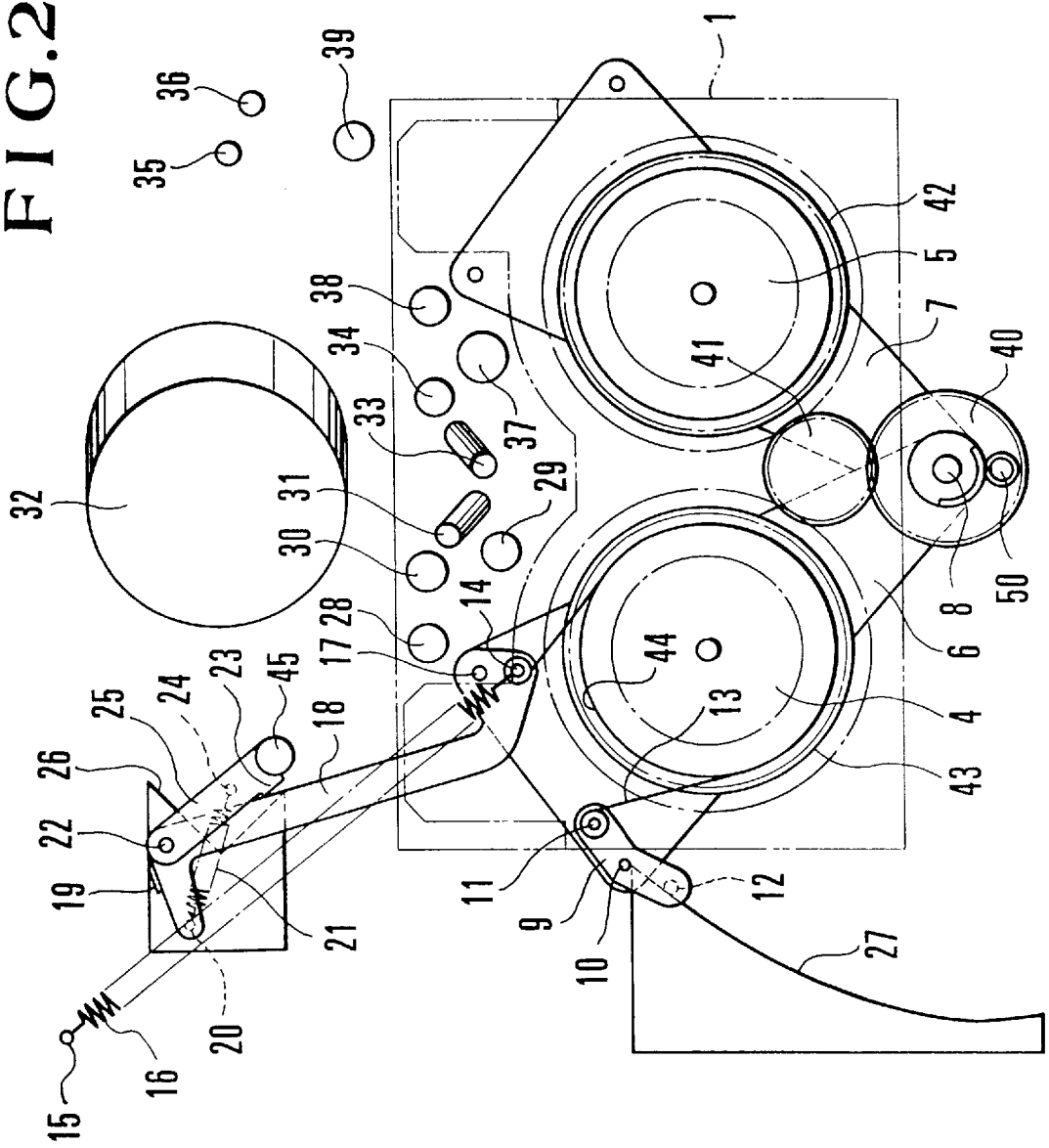
FIG. 2 is a plan view showing a first embodiment of this invention in a state obtained when a small-sized tape cassette is mounted on the embodiment.
Figure 3:
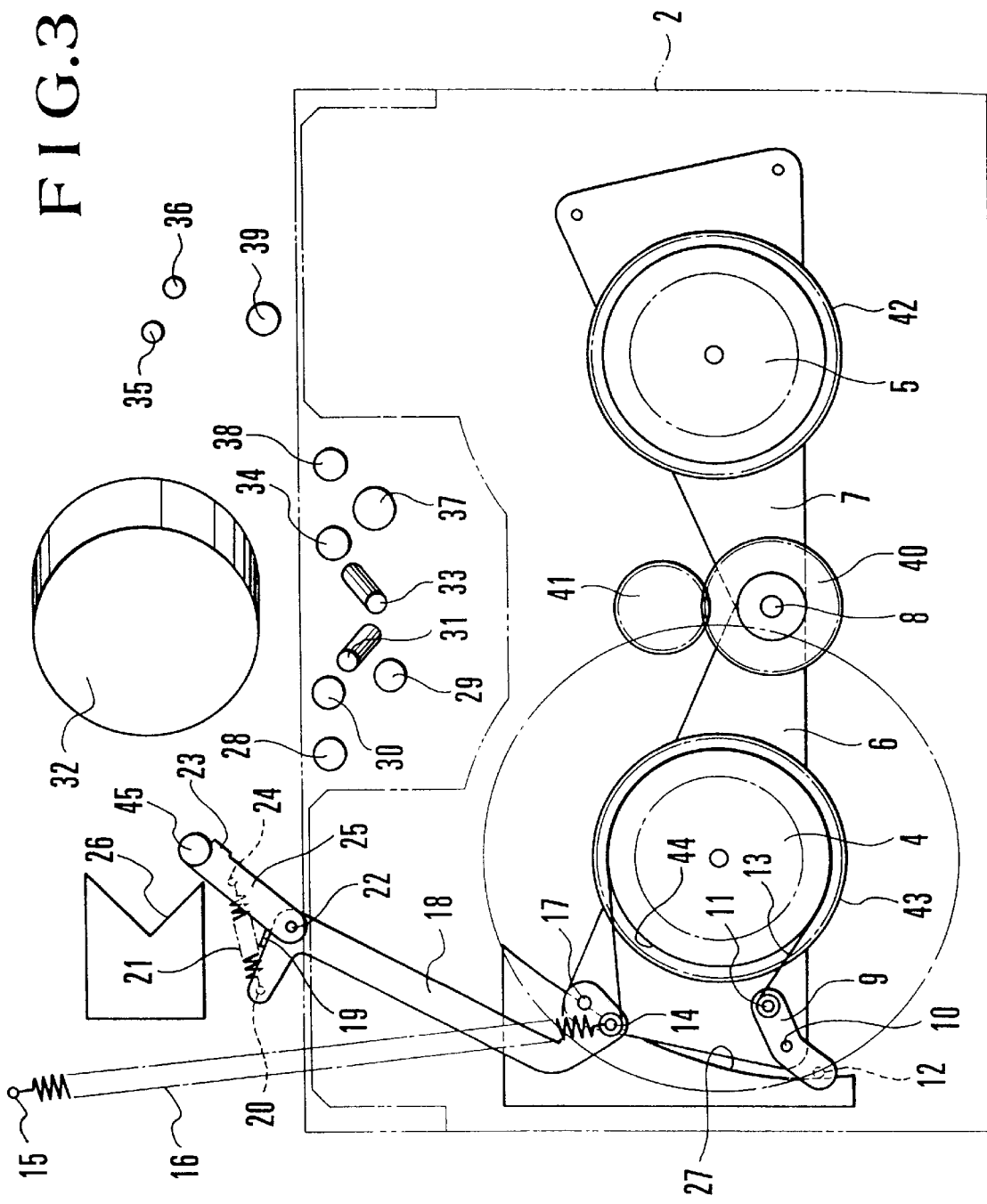
FIG. 3 is a plan view showing the first embodiment in a state obtained when a large-sized tape cassette is mounted on the embodiment.
Figure 4:
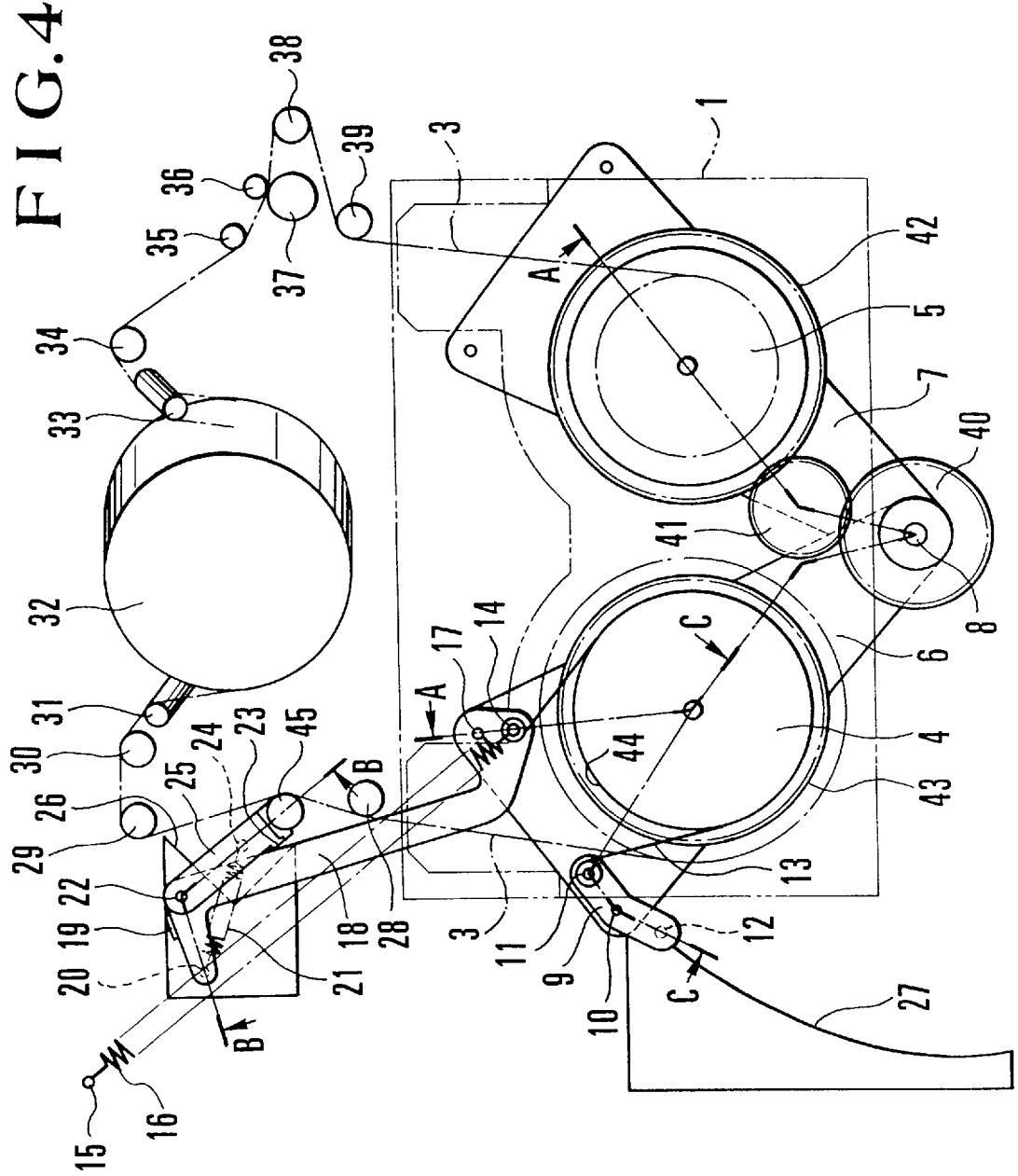
FIG. 4 is a plan view showing the first embodiment in a state obtained after a tape path is formed with the small-sized tape cassette mounted.
Figure 5:
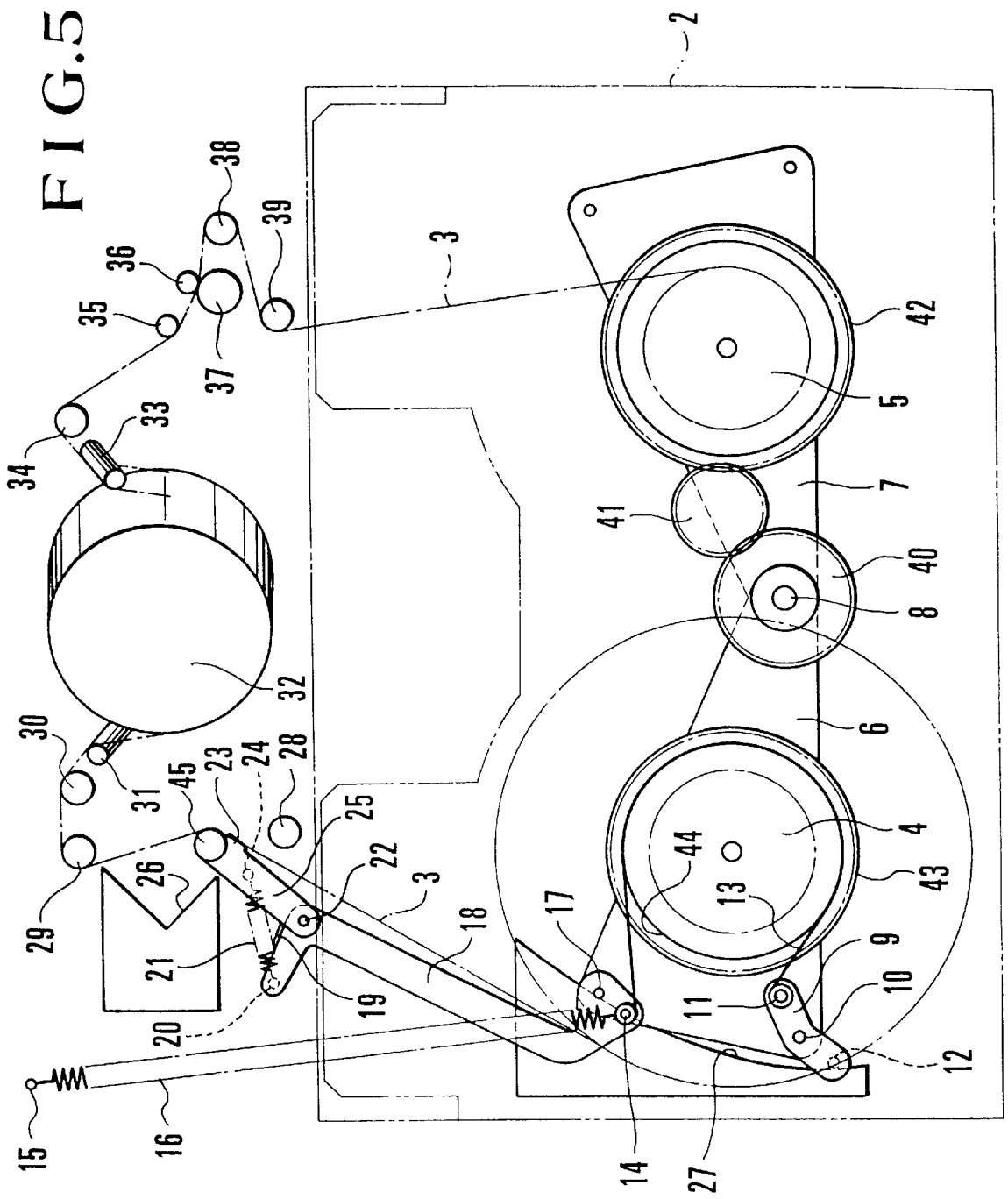
FIG. 5 is a plan view showing the first embodiment in a state obtained after a tape path is formed with the large-sized tape cassette mounted.
Figure 6:
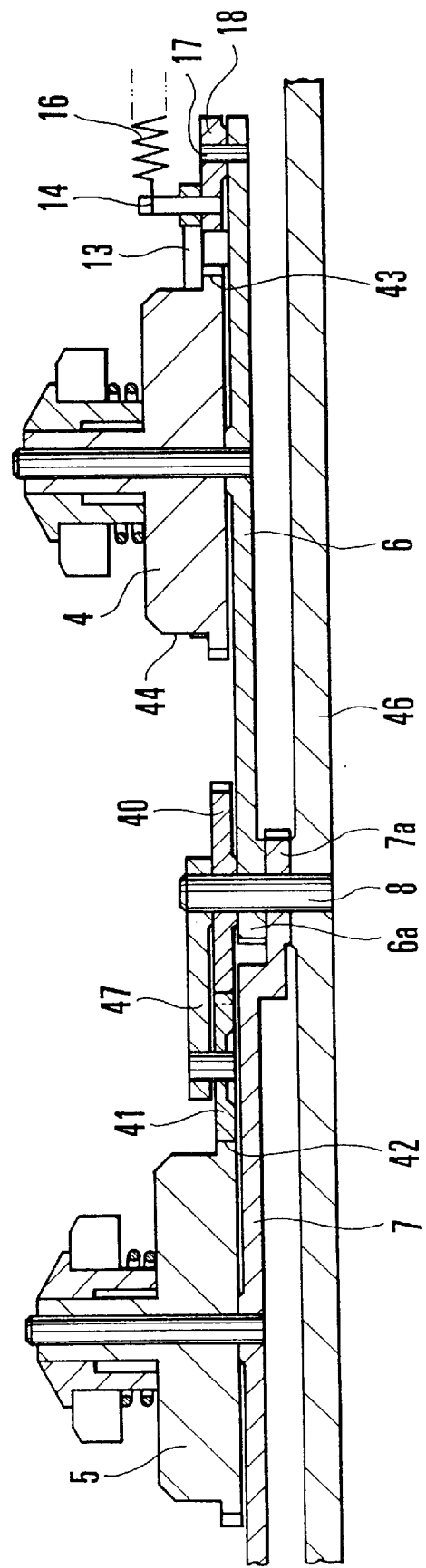
FIG. 6 is an enlarged development sectional view taken along a line indicated by arrows A in FIG. 4.
Figure 7:
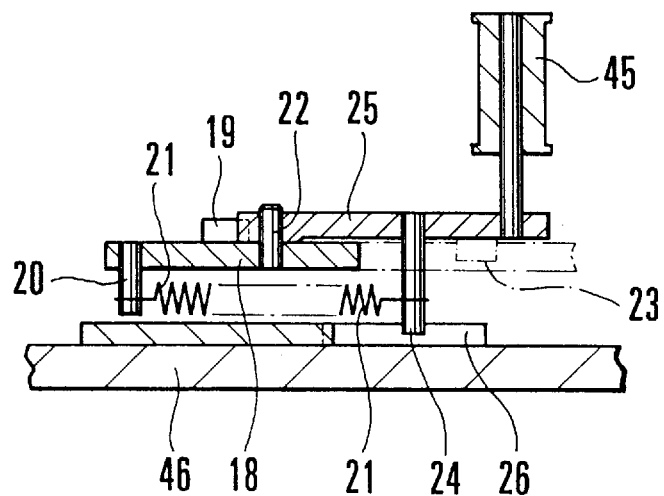
FIG. 7 is an enlarged development sectional view taken along a line indicated by arrows B in FIG. 4.
Figure 8:
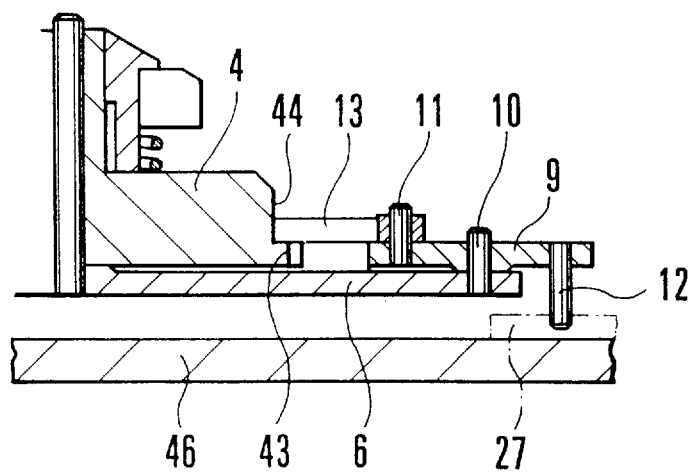
FIG. 8 is an enlarged development sectional view taken along a line indicated by arrows C in FIG. 4.

FIGS. 2 to 16 show a first embodiment of this invention. Of these figures, FIGS. 2 and 3 are plan views showing in outline the arrangement of the VTR including mainly a tape tension control mechanism and parts related thereto in states obtained respectively when a small-sized tape cassette and a large-sized tape cassette are mounted on the VTR. FIGS. 4 and 5 are plan views showing in outline the arrangement of the VTR in the states obtained after tape paths are formed respectively with the small-sized and large-sized tape cassettes mounted. FIGS. 6 to 8 are enlarged development sectional views taken respectively along lines indicated by arrows A, B and C in FIG. 4. FIGS. 9 to 16 are plan views showing in sequence the opening and closing actions of tension arms.

Referring first to FIGS. 2 to 5, there are illustrated a small-sized tape cassette 1, a large-sized tape cassette 2, a magnetic tape 3, a supply-side reel mount 4 and a takeup-side reel mount 5. A supply-side moving plate 6 is arranged to carry the supply-side reel mount 4. A takeup-side moving plate 7 is arranged to carry the takeup-side reel mount 5. A driving gear 50 engages gears formed in the peripheral parts of the support parts 6a and 7a of these moving plates 6 and 7 (FIG. 6) and is arranged to be rotated by the driving force of a motor which is not shown. When the driving gear 50 is rotated by the motor, the rotation causes these moving plates 6 and 7 to swing on a support shaft 8 in an interlocked manner.

The supply-side and takeup-side reel mounts 4 and 5 are respectively provided with gears 43 and 42 which are formed in the lower peripheral parts of these mounts and are arranged to have an idler gear 41 selectively engage them. As shown in FIG. 6, the idler gear 41 is rotatably carried by a plate 47 which is arranged to swing on the support shaft 8 erected on a chassis 46. The idler gear 41 is thus arranged to make an osculatory swinging action according to the rotating direction of the driving gear 40.

A brake drum 44 is disposed on the periphery of the supply-side reel mount 4. A brake band 13 is wrapped around the brake drum 44. A lever 9 is carried by a shaft 10 and is rotatable on the shaft 10 which is provided on the supply-side moving plate 6. A support part 11 is arranged at one end of the lever 9 to rotatably carry the brake band 13, as shown also in FIG. 8. A pin 12 is arranged at the other end of the lever 9 to abut on a cam wall 27.

A first tension arm 18 is carried by a support shaft 17 and is rotatable on the shaft 17 which is provided on the supply-side moving plate 6. A support part 14 is arranged on the first tension arm 18 to rotatably carry the other end of the brake band 13 and also to carry one end of a tension spring 16. A support part 15 is arranged to carry the other end of the tension spring 16.

As shown also in FIG. 7, a second tension arm 25 is rotatably carried by a support shaft 22 which is provided on the first tension arm 18. A tension detecting guide 45 is provided at the fore end of the second tension arm 25. Between a support part 20 provided on the first tension arm 18 and a support part 24 provided on the second tension arm 25, a spring 21 is stretched in such a way as to cause the second tension arm 25 to perform a toggling action on the first tension arm 18. The support part 24 of the second tension arm 25 carries the spring 21 and also serves as a pin abutting on a cam wall 26.

Therefore, when the small-sized tape cassette 1 is mounted on the VTR, as shown in FIG. 2, the second tension arm 25 is urged by the spring 21 to turn clockwise. However, a stopper 23 which is provided on the second tension arm 25 abuts on the first arm 18 to keep the second tension arm 25 in a predetermined position in a folded state.

When the large-sized tape cassette 2 is mounted on the VTR, as shown in FIG. 3, the second tension arm 25 is urged to turn counterclockwise by the spring 21. However, a stopper 19 provided on the first tension arm 18 causes the second tension arm 25 to abut thereon to keep the second tension arm 25 in a predetermined position in a spread state.

In FIGS. 2 to 5, reference numerals 28, 29, 30 and 31 denote tape guides. Reference numeral 32 denotes a rotary drum on which a magnetic head is mounted. Reference numerals 33, 34 and 35 denote tape guides. Reference numeral 36 denotes a capstan shaft. Reference numeral 37 denotes a pinch roller. Reference numerals 38 and 39 denote tape guides.

A tape transport action to be performed when the small-sized tape cassette 1 is mounted on the VTR is described with reference to FIG. 4 as follows. The magnetic tape 3 is pulled out from the tape cassette 1 jointly by the tape guides 28, 29, 30, 31, 33, 34 and 38 and the pinch roller 37 to form a tape path. In other words, the tape 3 is pulled out from a supply reel which is disposed on the supply-side reel mount 4. The tape 3 then comes to abut on the tension detecting guide 45 through the tape guide 28. The tape 3 further comes to be wrapped around the rotary drum 32 through the tape guides 29, 30 and 31 for magnetic recording or reproduction. The tape 3 further comes to be pinched in between the capstan shaft 36 and the pinch roller 37 through the tape guides 33, 34 and 35. Under this condition, the magnetic tape 3 is transported at a predetermined speed by the capstan shaft 36 which is rotated at the predetermined speed by a capstan motor. The tape 3 is thus wound around a takeup reel disposed on the takeup-side reel mount 5 through the tape guides 38 and 39. In the case of this embodiment, the tension detecting guide 45 abuts on the tape 3 from outside the tape path.

The takeup reel is rotated by the takeup-side reel mount 5 which is rotated by the driving gear 40 through the idler gear 41. The magnetic tape 3 is wound up accordingly as the takeup reel is rotated. The supply reel in the meantime receives a back torque according to the tension of the brake band 13 which is wrapped around the brake drum 44 of the supply-side reel mount 4. As a result, a predetermined tension is imparted to the tape 3.

The tape tension control action is described as follows. The tape tension imparts a counterclockwise moment of rotation to the first tension arm 18 through the stopper 23 and the tension detecting guide 45 which abuts on the magnetic tape 3. A clockwise moment developed by the spring 16 and a counterclockwise moment by the brake band 13 are also imparted to the first tension arm 18.

The counterclockwise moment of the first tension arm 18 increases when the tape tension increases. Then, the tension of the brake band 13 comes to decrease due to the balance of the moments. The back torque imparted to the supply-side reel mount 4 decreases accordingly. As a result, the tension of the tape 3 pulled out from the supply reel comes to decrease. The decrease of the tape tension then causes the counterclockwise moment of the first tension arm 18 to decrease and, contrary to this, the tension of the brake band 13 increases. Therefore, the back torque imparted to the supply-side reel mount 4 increases to cause the tension of the tape 3 pulled out from the supply reel to increase.

In a case where the large-sized tape cassette 2 is mounted, the embodiment operates as described in the following with reference to FIG. 5. The tape path is formed in about the same manner as in the case of the small-sized cassette 1. Therefore, the description of the tape transport action is omitted and the following describes only the tape tension control action. The tape tension imparts a counterclockwise moment of rotation to the first tension arm 18 through the stopper 19 and the tension detecting guide 45 which abuts on the magnetic tape 3. Further, a clockwise moment developed by the spring 16 and the counterclockwise moment by the brake band 13 are also applied to the first tension arm 18.

When the tape tension increases, the counterclockwise moment of the first tension arm 18 also increases. The tension of the brake band 13 on the other hand decreases to decrease the back torque imparted to the supply-side reel mount 4. The tension of the tape 3 pulled out from the supply reel then decreases accordingly. The tape tension control action in this case is thus performed basically on the same operating principle as in the case of the small-sized tape cassette 1.

However, in the tape tension control mechanism of the first embodiment, the parameters MS and LT among the basic parameters (MS, LB, RD and LT) of the formula (3) mentioned in the foregoing vary with the type of the tape cassette mounted, i.e., according to the small-sized cassette 1 or the large-sized cassette 2. More specifically, in the case of the large-sized tape cassette 2, the radius of swing of the tension detecting guide 45 is caused to become twice as large as the radius set for the small-sized tape cassette 1. By this arrangement, the rate of change of the tape tension T in relation to that of the tape coil radius R can be held to a low rate, because the basic parameter LT is increased, even in cases where the tape coil radius R on the reel varies much as in the case of the large-sized tape cassette 2.

Further, in the case of the first embodiment, the center of swing (the support shaft 17) of the first tension arm 18 is set in such a position that the amount of a component of a composite force on the tension detecting guide 45 in the direction of the radius of swing obtained with the large-sized tape cassette 2 mounted remains almost equal to the amount obtained when the small-sized tape cassette 1 is mounted. The change in the basic parameter LT is arranged to be determined solely by the radius of swing of the tension detecting guide 45. Therefore, the tension control performance obtained with the small-sized tape cassette 1 mounted can be retained also when the large-sized tape cassette 2 is mounted. Further, in the case of the first embodiment, the position of the tension detecting guide 45 obtained with the small-sized tape cassette 1 mounted does not change when the large-sized tape cassette 2 is mounted. When the large-sized tape cassette 2 is mounted, the same tape travel characteristic thus can be obtained without readjusting the tape path. Therefore, the travel of the tape can be adjusted without paying heed to the type of the tape cassette mounted.

Further, in the case of the first embodiment, the position of the support part 15 of the tension spring 16 remains unchanged when the supply-side reel mount 4 moves. Therefore, the set value of the tape tension T can be kept unvarying by changing the basic parameter MS in such a way as to absorb the changes of the basic parameters taking place according to the formula (3). In the first embodiment, since the support part 15 of the spring 16 is disposed to attain the arrangement mentioned above, it is not necessary to move the fixed end of the spring for the purpose of changing the set spring force as the supply-side reel mount 4 moves.

Figure 9:
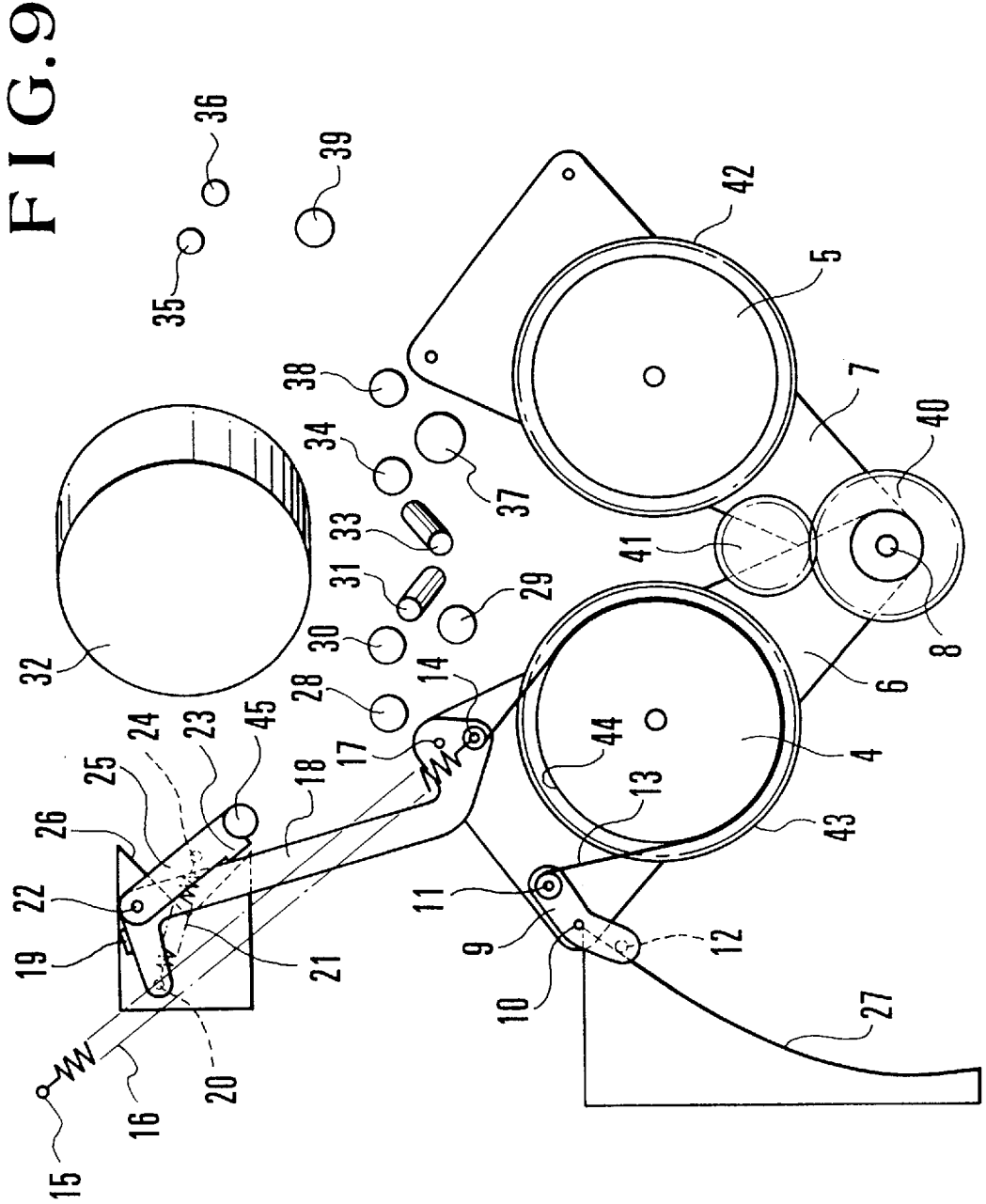
FIG. 9 is a plan view showing the moving action of a reel mount moving mechanism and that of a tape tension control mechanism in the first embodiment.

The moving actions of the reel mount moving mechanism and the tape tension control mechanism in the first embodiment are described with reference to FIGS. 9 to 16 as follows. Referring to FIG. 9, when the small-sized tape cassette 1 is mounted on the VTR, the first and second tension arms 18 and 25 are in a state of being folded down by the spring 21. The first tension arm 18 receives a clockwise moment from the spring 16 and thus pulls the brake band 13. The brake band 13 imparts a clockwise moment to the lever 9. However, since the pin 12 of the lever 9 is abutting on the cam wall 27, the lever 9 is set in position without turning.

Under this condition, when the two reel mounts 4 and 5 are caused to begin to move by the plates 6 and 7 which receive the driving force of the driving gear 50 and move in opposite directions. Then, the action is performed on the reel mounts 4 and 5 to sequentially bring about varying states as shown in the order of FIGS. 9, 10, 11, 12 and 13. These reel mounts 4 and 5 eventually reach their positions for the large-sized tape cassette 2 as shown in FIG. 14. This action is sequentially described in the following. In FIGS. 10 to 14 and also in FIGS. 15 and 16 which will be referred to later herein, the rotary drum 32, the guides 28, 29, 30, 31, 33, 34, 35, 38 and 39, the capstan 36 and the pinch roller 37 are omitted.

Figure 10:
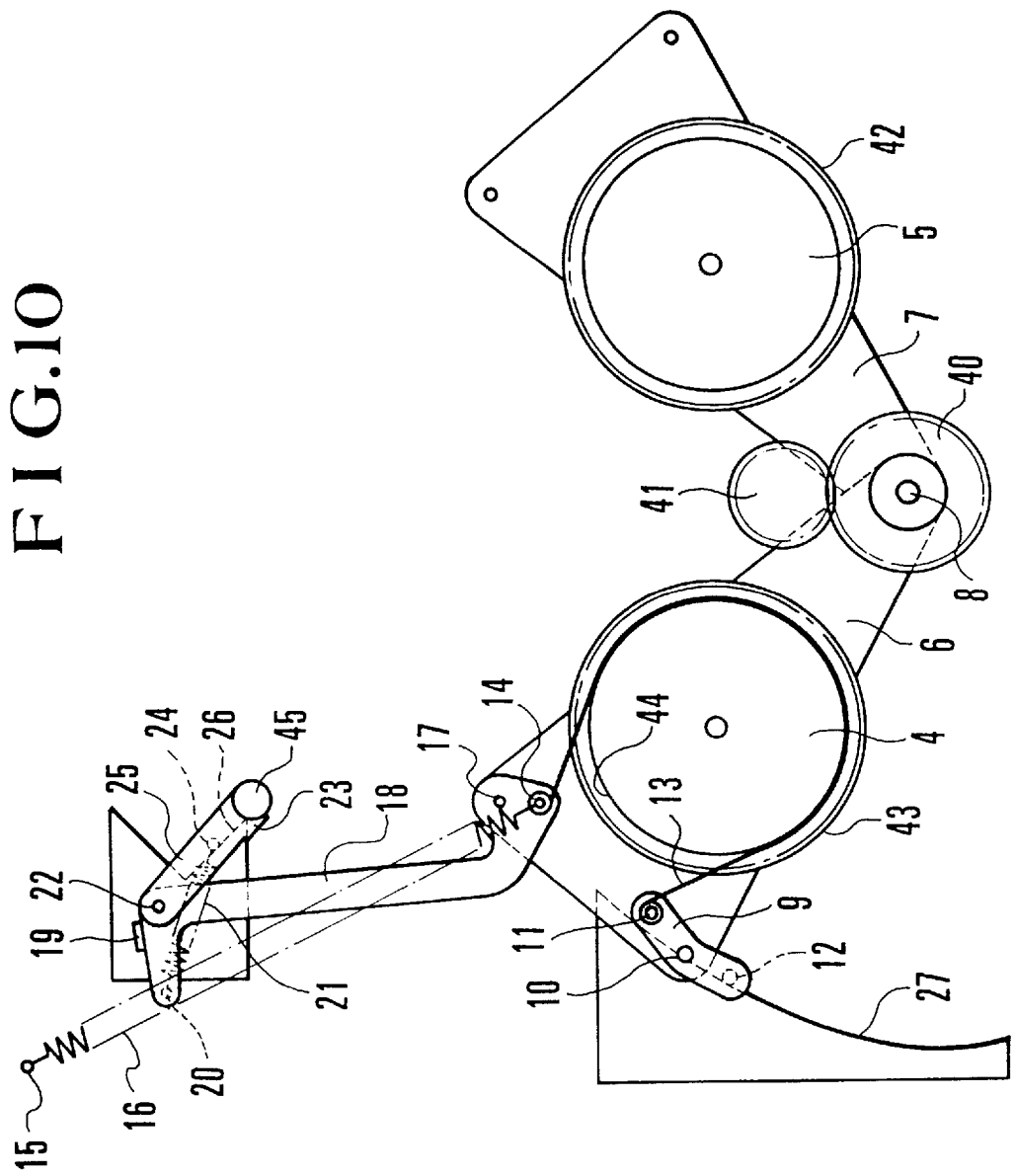
FIG. 10 is a plan view also showing the abovestated moving actions.

First, in a stage of the action as shown in FIG. 10, when the moving plate 6 moves, the pin 12 of the lever 9 moves along the cam wall 27 to cause the lever 9 to swing on the support shaft 10. This movement determines the swinging displacement of the first tension arm 18 through the brake band 13. The second tension arm 25 on the other hand begins to swing counterclockwise as its pin (support part) 24 abuts on the cam wall 26.

Figure 11:
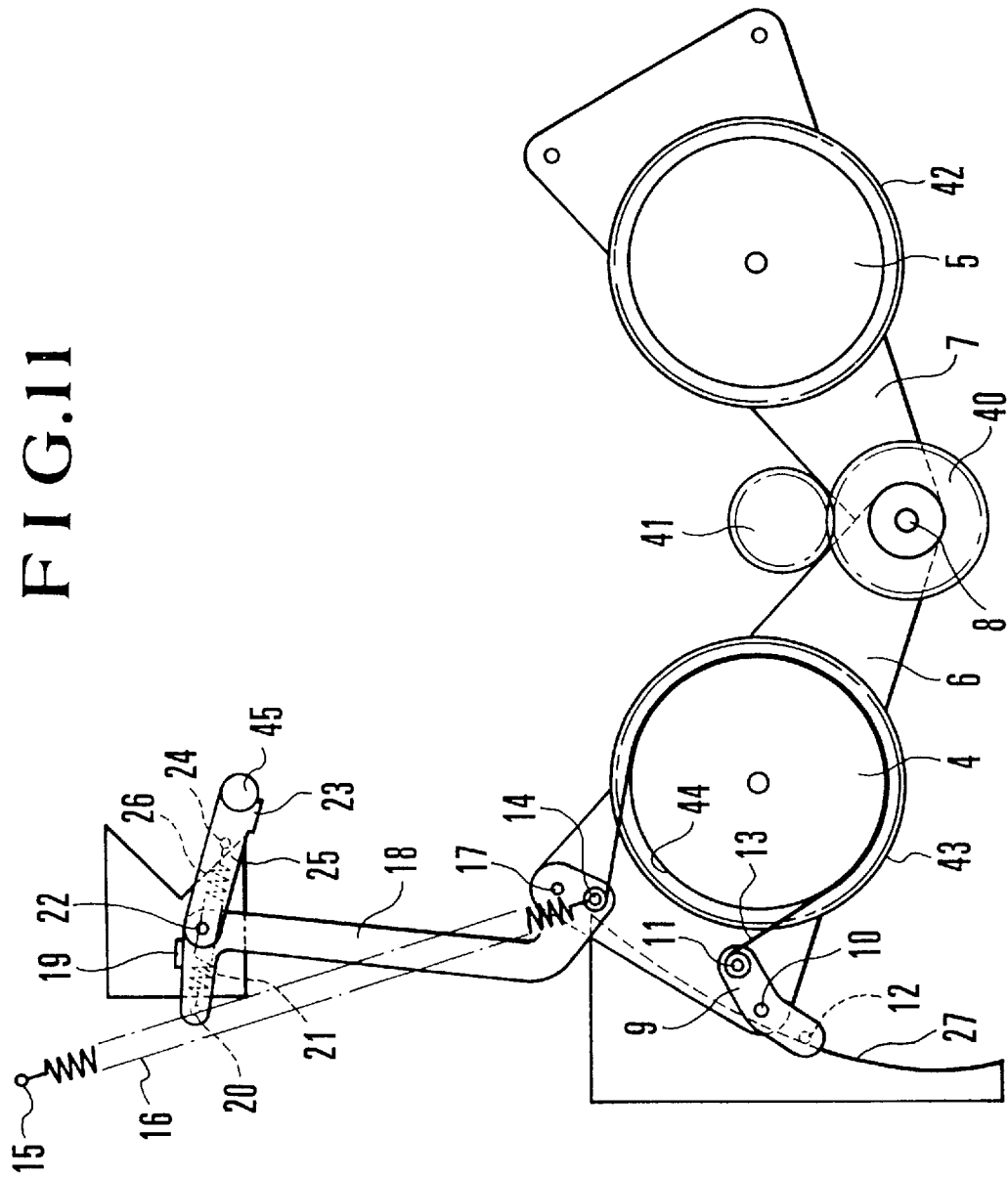
FIG. 11 is a plan view further showing the above-stated moving actions.
Figure 12:
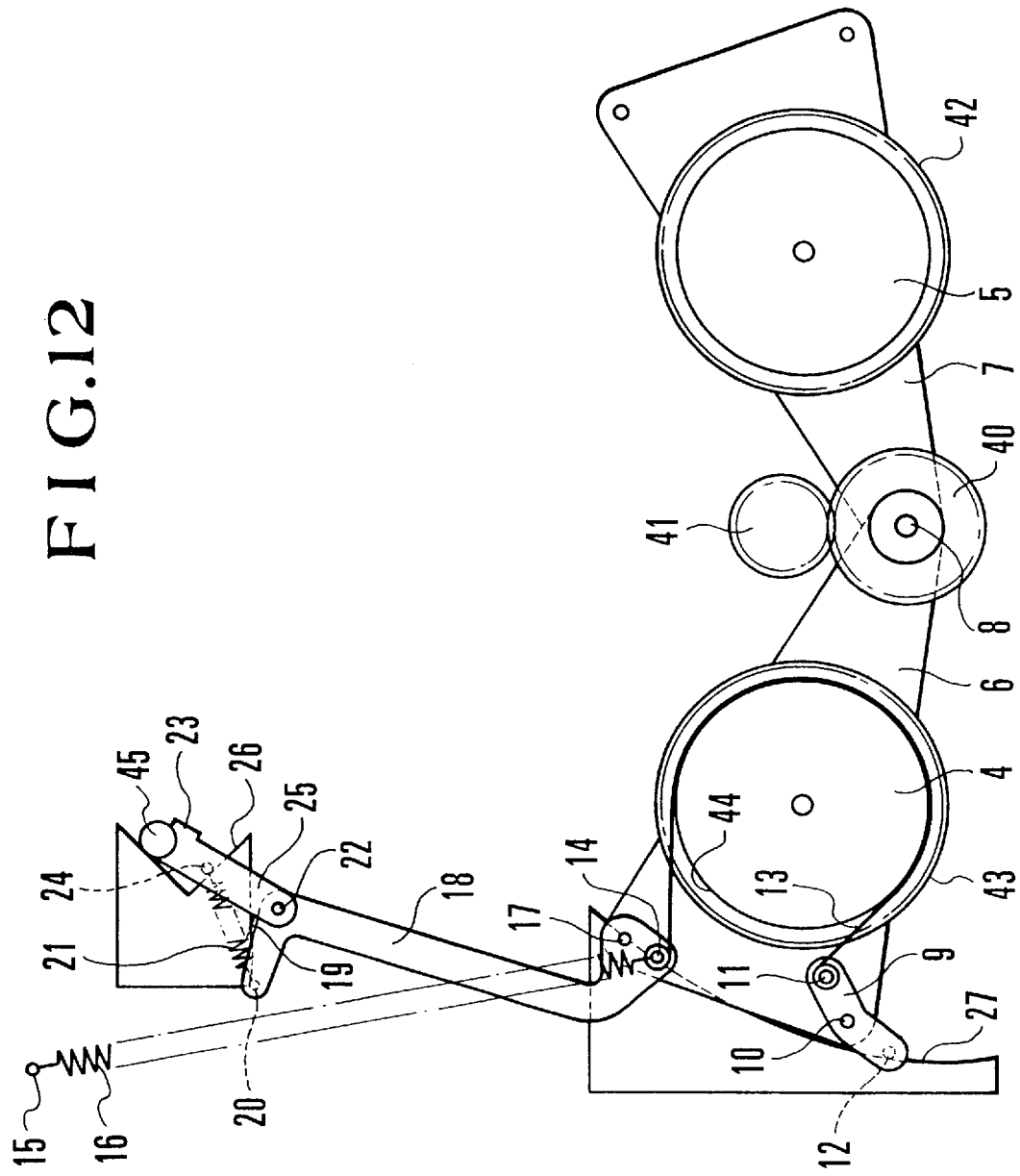
FIG. 12 is a plan view still further showing the above-stated moving actions.

In a stage as shown in FIG. 11, the second tension arm 25 makes a predetermined swinging motion. After that, the second tension arm 25 is caused by the tensile force of the spring 21 to turn until it comes to abut on the stopper 19 of the first tension arm 18 as shown in FIG. 12. In other words, the second tension arm 25 moves to a position where it is in an open state in relation to the first tension arm 18.

Figure 13:
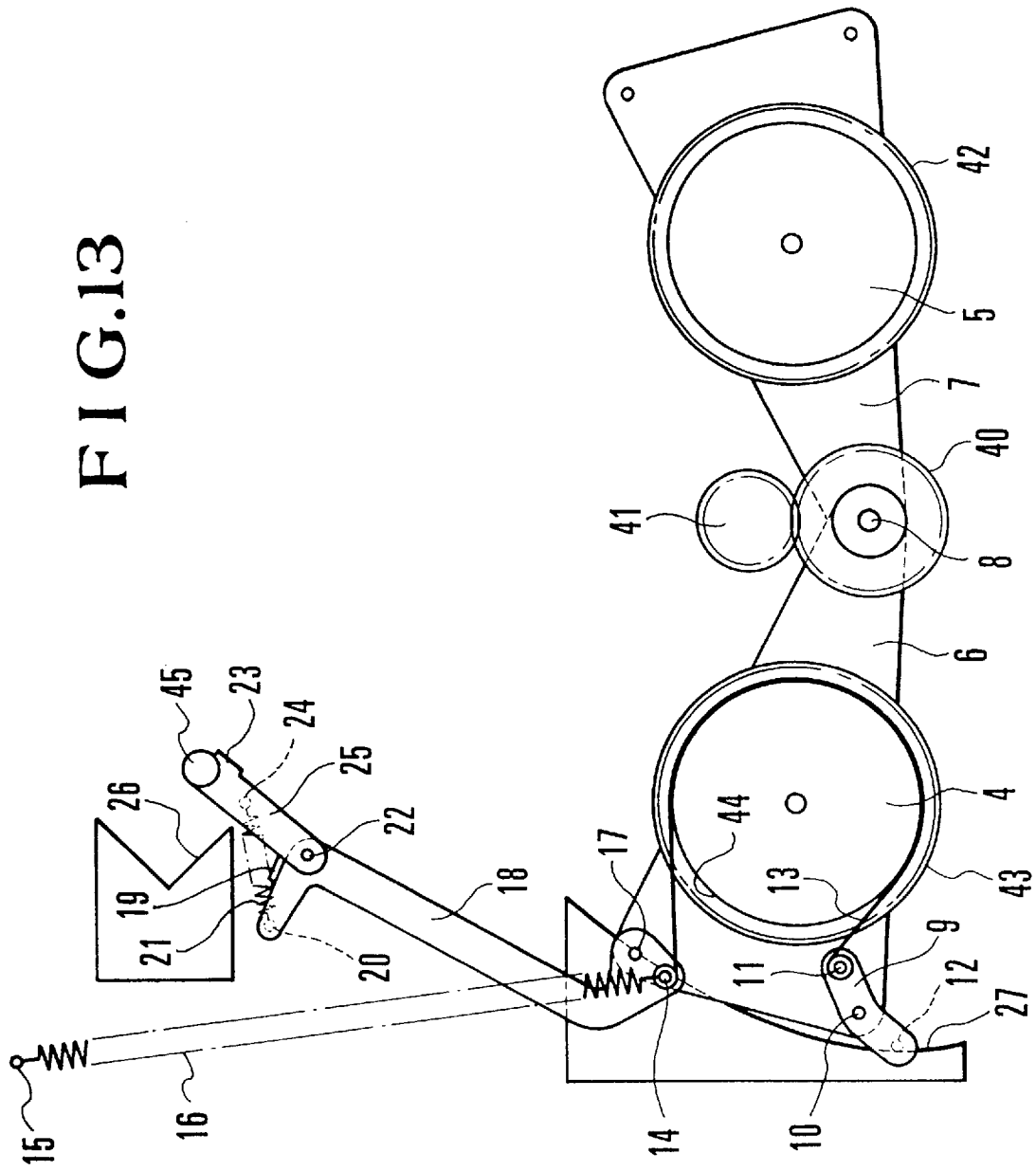
FIG. 13 is a plan view also showing the above-stated moving actions.
Figure 14:
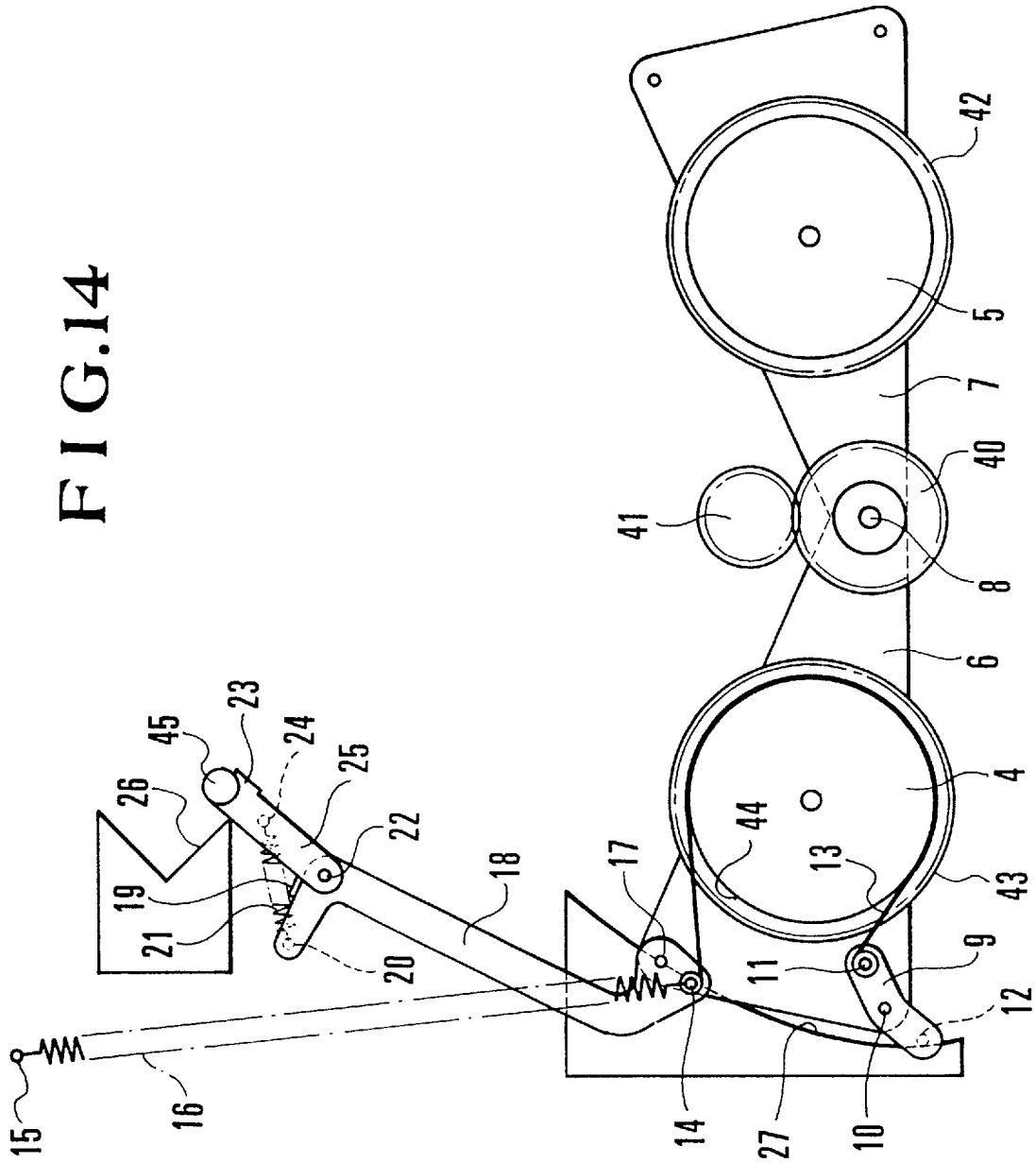
FIG. 14 is a plan view also showing the above-stated moving actions.

In a stage as shown in FIG. 13, the first and second tension arms 18 and 25 have the support shaft 17 which is at the center of rotation move according to the movement of the moving plate 6. In addition to that, the first and second tension arms 18 and 25 come to further swing according to the movement of the pin 12 of the lever 9 relative to the cam wall 27. The first and second tension arms 18 and 25 are eventually moved to a position for mounting the large-sized tape cassette as shown in FIG. 14.

A moving action to be performed from the large-sized cassette mounting position to the small-sized cassette mounting position is next described as follows.

Figure 15:
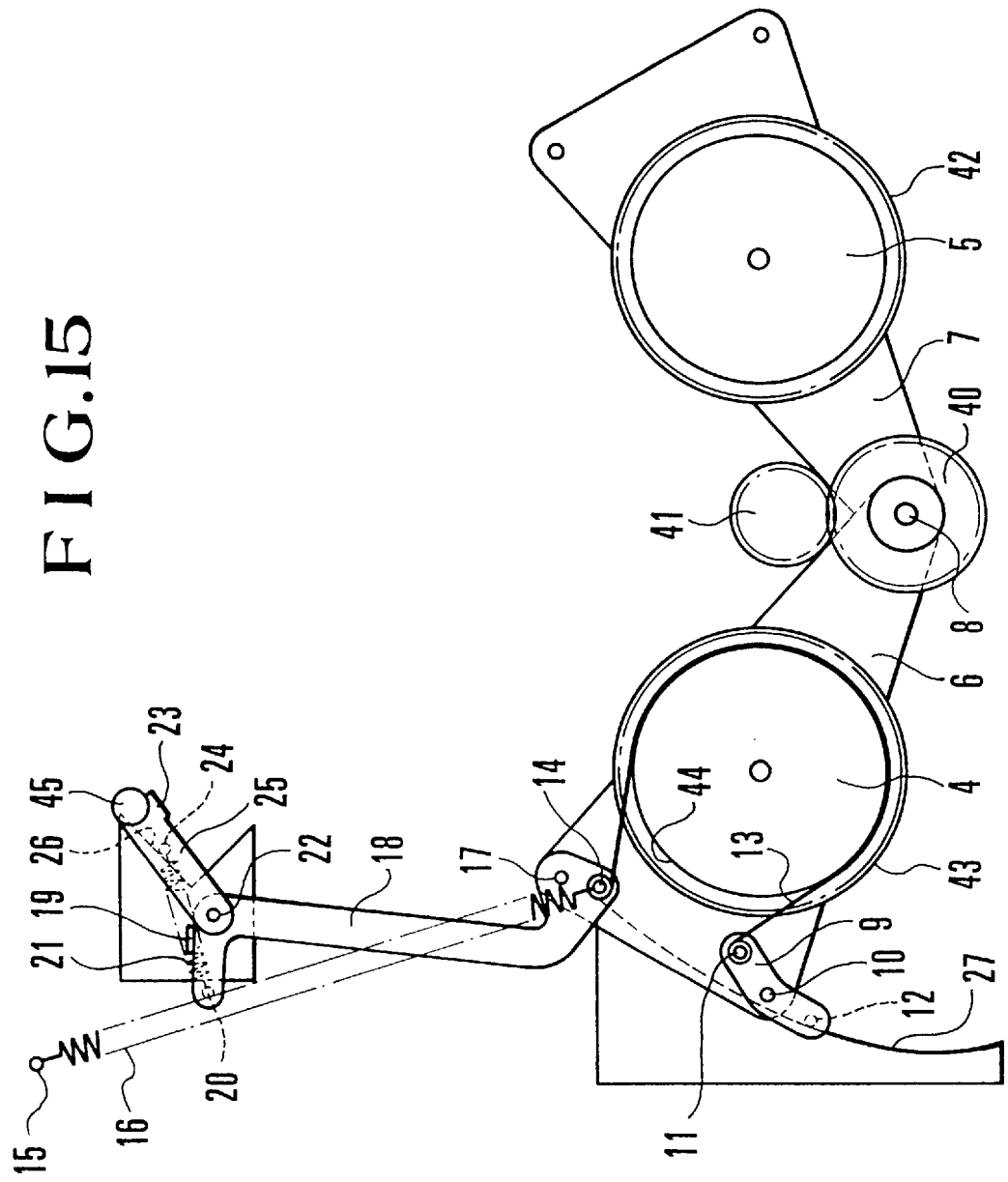
FIG. 15 is a plan view also showing the above-stated moving actions.
Figure 16:
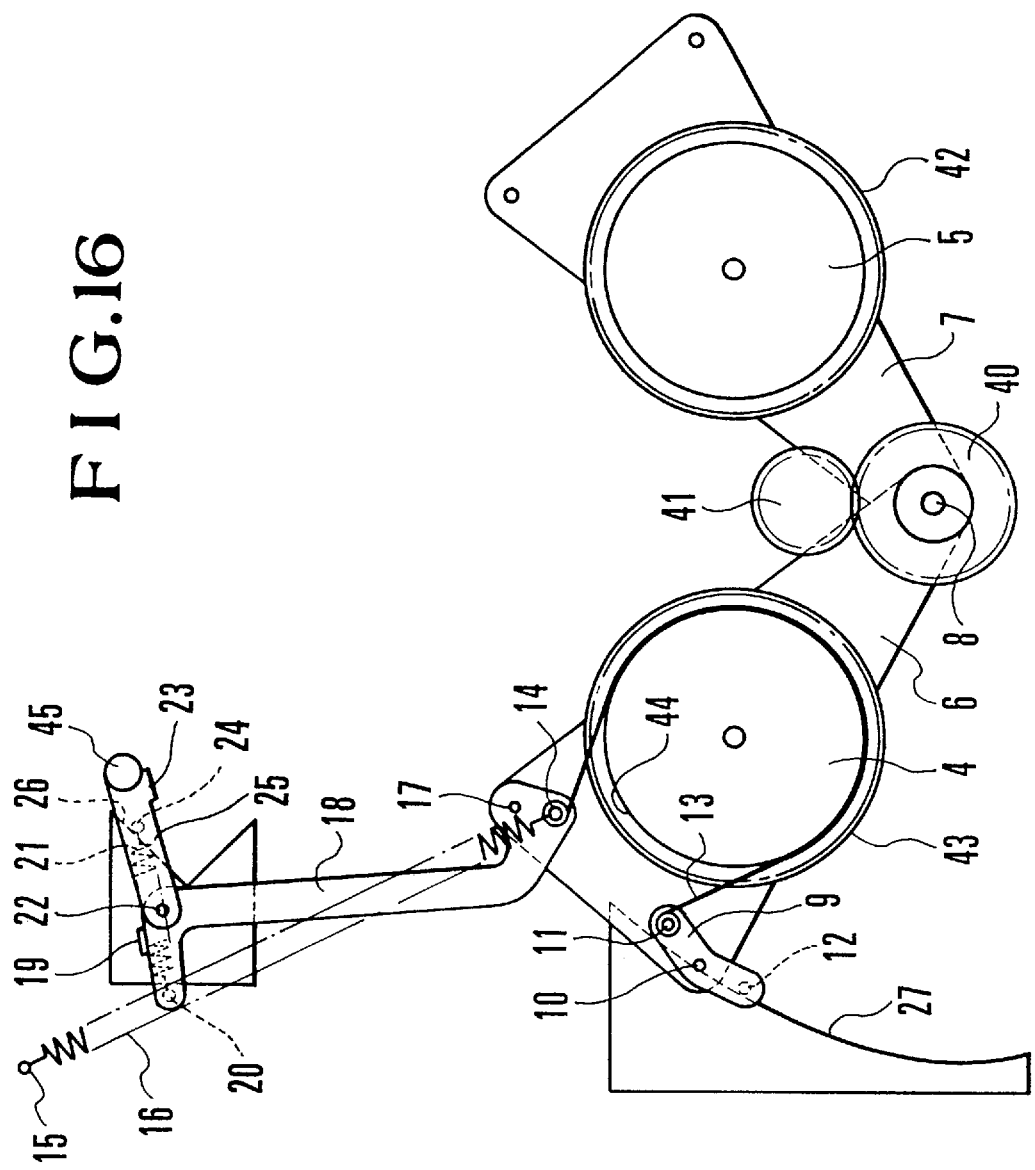
FIG. 16 is a plan view also showing the above-stated moving actions.

When the moving plate 6 begins to move from its position shown in FIG. 14, an action is performed to sequentially bring about the varying states as shown in FIGS. 12 to 13 in the order of FIGS. 14, 13 and 12 which is reverse to the action described above. When the moving plate 6 moves further, the pin (support part) 24 of the second tension arm 25 comes to abut on the cam wall 26 to cause the second tension arm 25 to make a clockwise motion as shown in FIG. 15. When the moving plate 6 moves still further, the second tension arm 25 swings further clockwise as shown in FIG. 16. After the second tension arm 25 swings to a predetermined degree, the spring 21 causes the second tension arm 25 to come to the position where the second tension arm 25 is folded down relative to the first tension arm 18 as shown in FIG. 9. The second tension arm 25 is thus moved to the small-sized cassette mounting position which is as shown in FIG. 9.

The first embodiment is thus arranged to perform the opening and closing actions on the first and second tension arms 18 and 25 by utilizing the driving force of the movement of the two reel mounts 4 and 5. This arrangement, therefore, permits the related mechanisms to be simply arranged and thus advantageously permits reduction in number of necessary parts.

Figure 17:
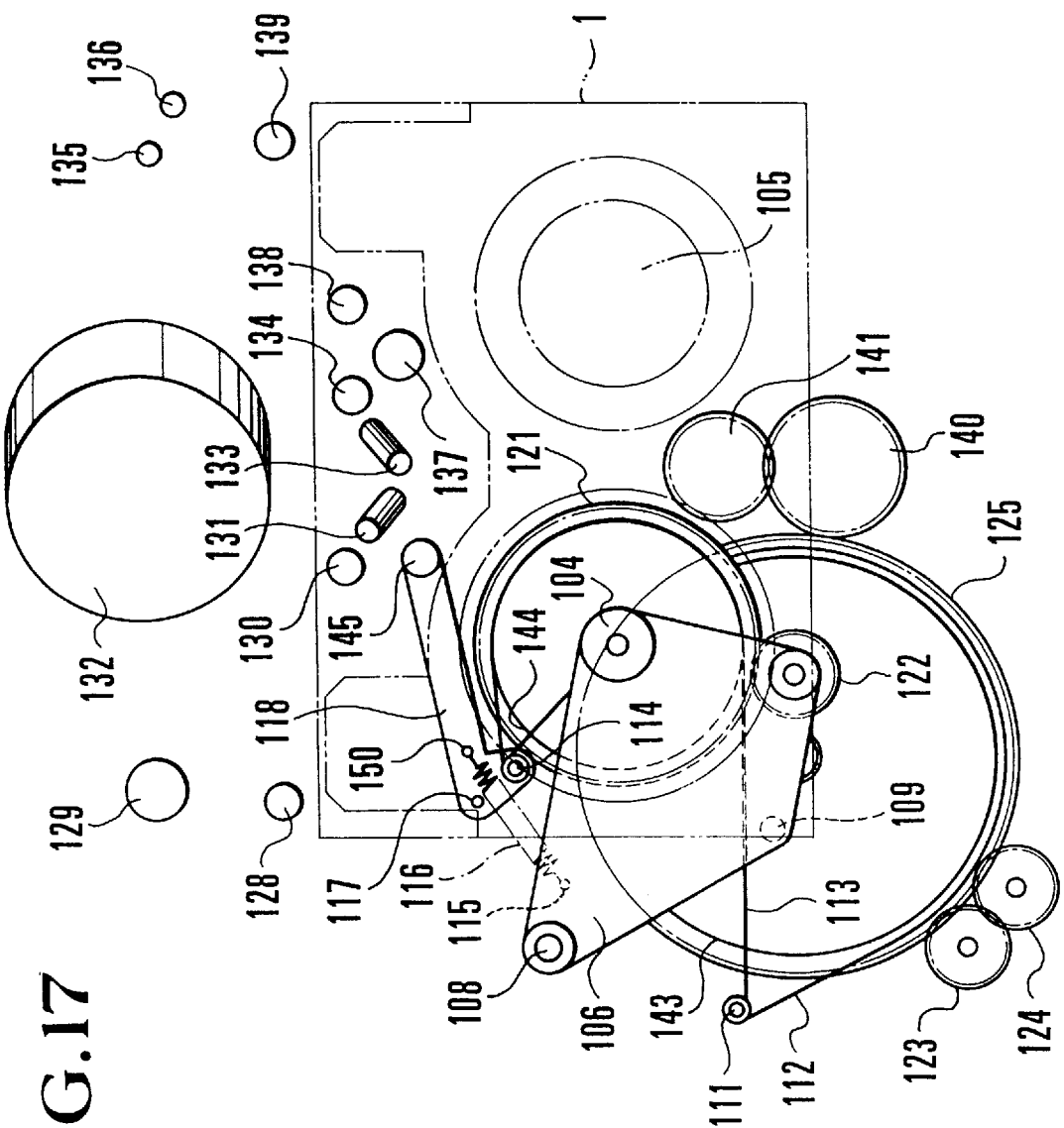
FIG. 17 is a plan view showing a second embodiment of this invention in a state obtained when a small-sized tape cassette is mounted on the embodiment.
Figure 18:
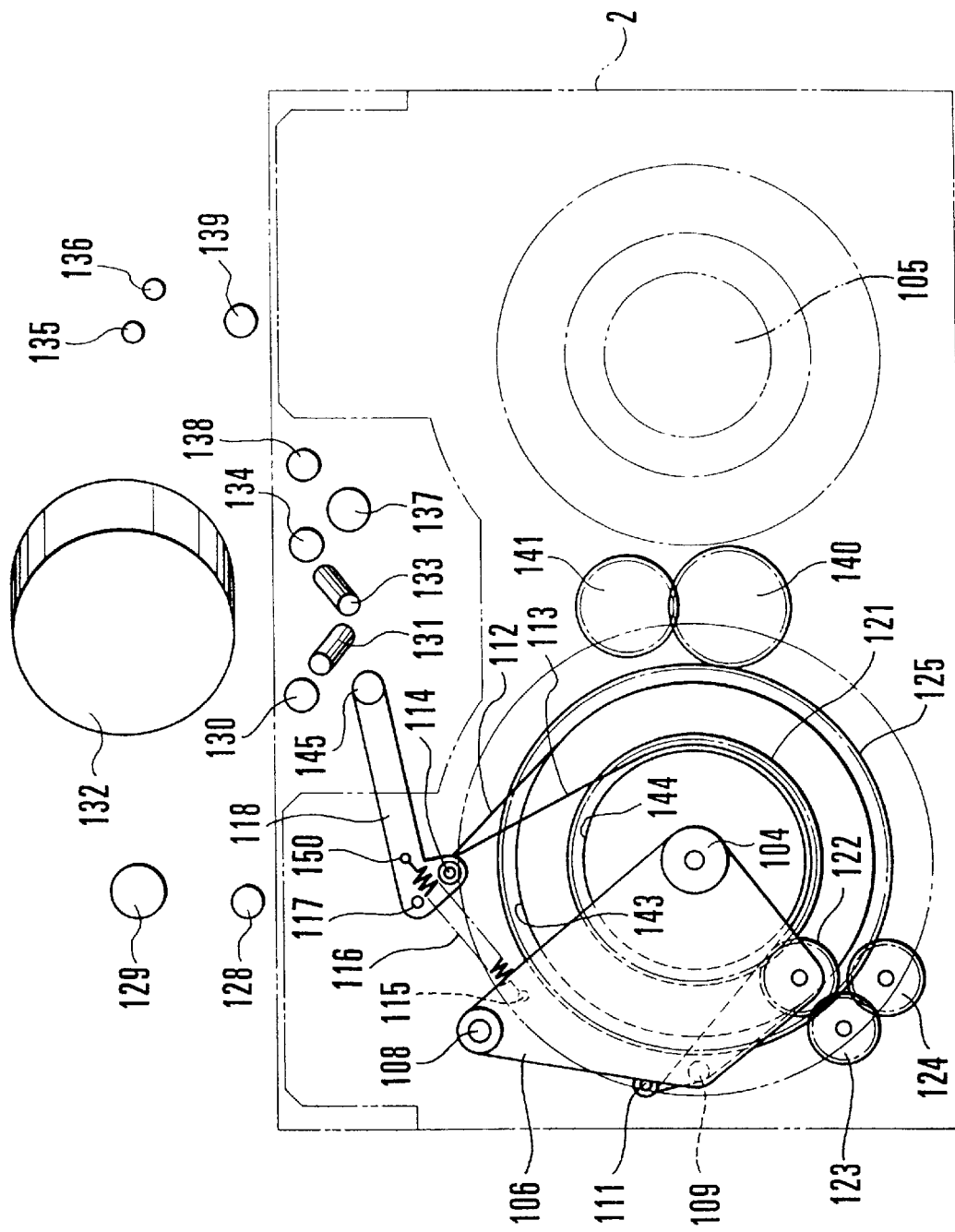
FIG. 18 is a plan view showing the second embodiment in a state obtained when a large-sized tape cassette is mounted on the embodiment.
Figure 19:
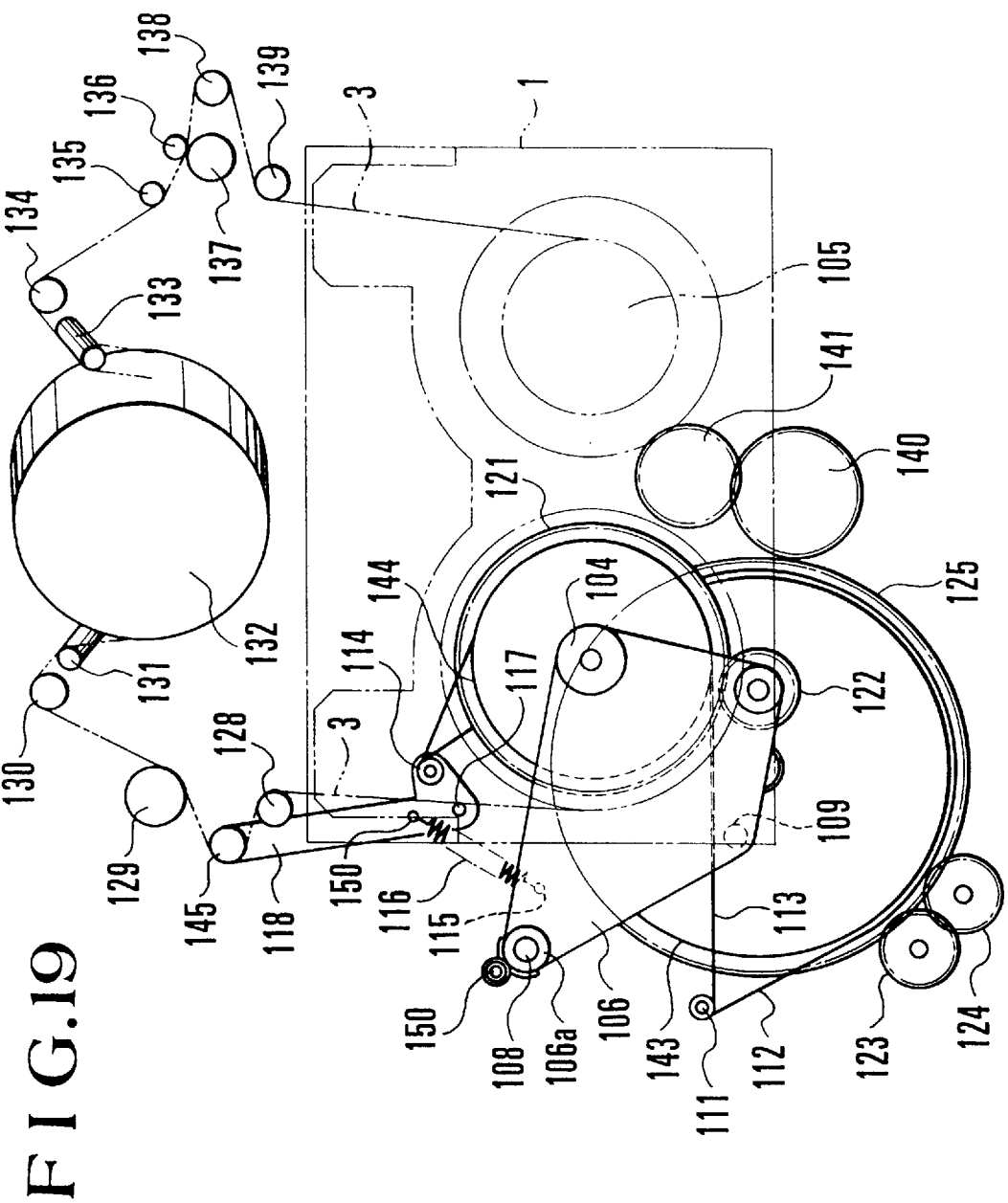
FIG. 19 is a plan view showing the second embodiment in a state obtained after a tape path is formed with the small-sized tape cassette mounted.
Figure 20:
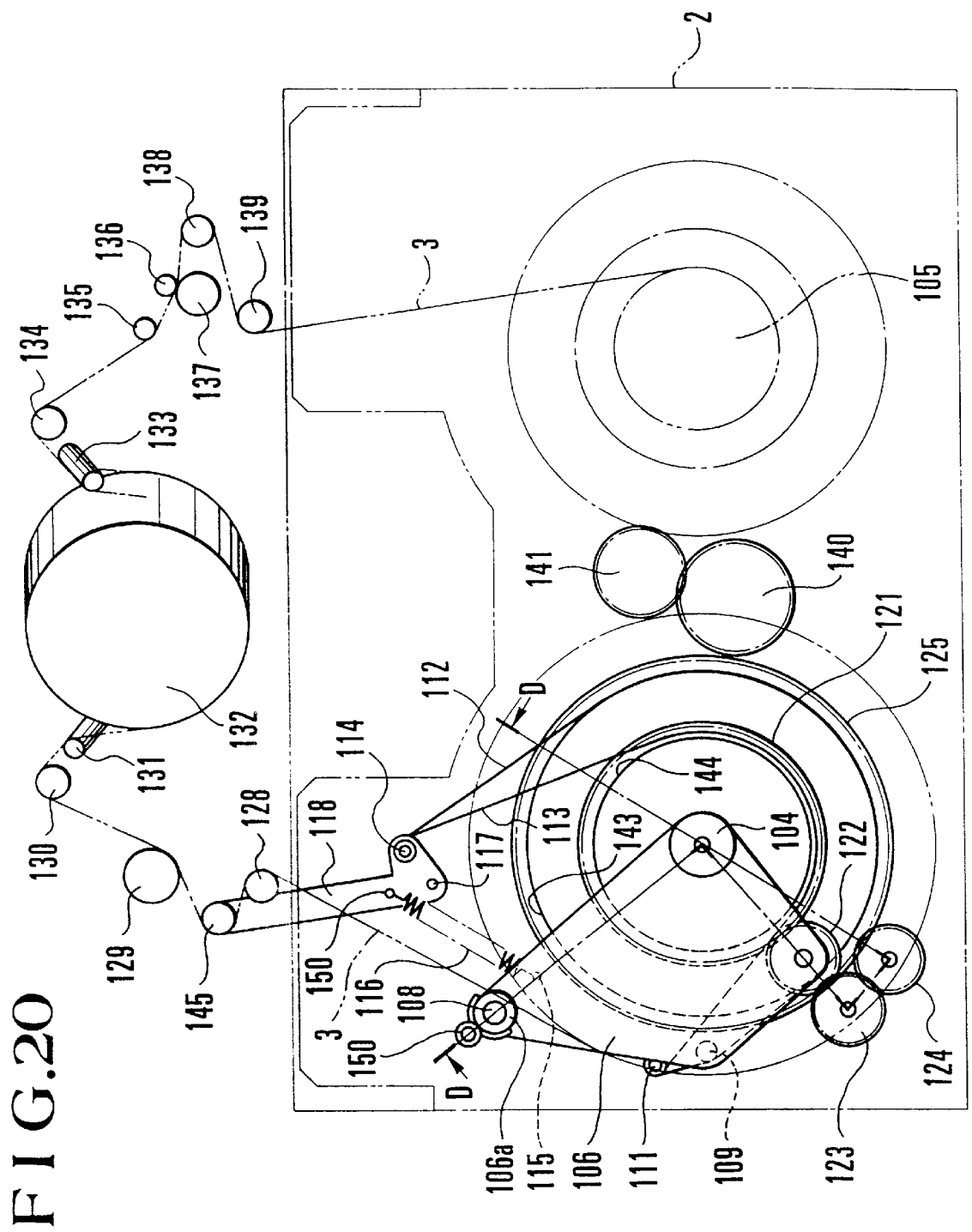
FIG. 20 is a plan view showing the second embodiment in a state obtained after a tape path is formed with the large-sized tape cassette mounted.
Figure 21:
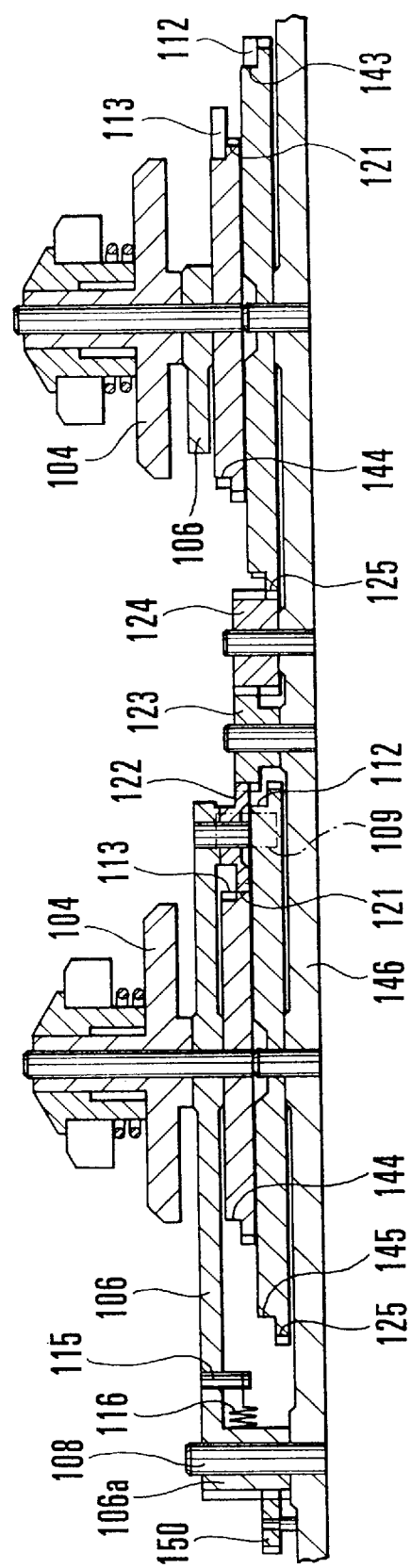
FIG. 21 is an enlarged development sectional view taken along a line indicated by arrows D in FIG. 20.

A second embodiment of this invention is next described with reference to FIGS. 17 to 21 as follows:

FIGS. 17 and 18 are plan views showing, in outline, mainly a tape tension control mechanism of a VTR arranged as the second embodiment of this invention. FIG. 17 shows a state obtained with a small-sized tape cassette mounted while FIG. 18 shows a state obtained with a large-sized tape cassette mounted on the VTR. FIGS. 19 and 20 are plan views respectively showing in outline the states of the VTR obtained after tape paths are formed with the small-sized and large-sized tape cassettes mounted. FIG. 21 is an enlarged development sectional view taken along a line indicated by arrows D in FIG. 20.

In FIGS. 17 to 20, there are illustrated a small-sized tape cassette 1, a large-sized tape cassette 2, a magnetic tape 3, a supply-side reel mount 104 and a takeup-side reel mount 105. A supply-side moving plate 106 is arranged to carry the supply-side reel mount 104 and to be swung on a support shaft 108. A takeup-side moving plate which is arranged to carry the takeup-side reel mount 105 is omitted from the illustrations.

A brake band retaining pin 109 is provided on the moving plate 106. A brake band 112 is provided for the large-sized tape cassette 2. A brake band 113 is provided for the small-sized tape cassette 1. One end of the brake band 113 for the small-sized tape cassette 1 has one end thereof locked to a support part 111 which is erected on a chassis 146 and other end locked to a support part 114 which is provided on a tension arm 118.

The tension arm 118 is swingable on a support shaft 117 and has a tension detecting guide 145 disposed at its fore end. A tension spring 116 has one end of it locked to a shaft 115 erected on the moving plate 106 and the other end to a support part 150 disposed on the tension arm 118. The tension spring 116 is thus arranged to impart a counterclockwise moment to the tension arm 118 to urge it to swing counterclockwise on the support shaft 117. A brake drum 114 is provided for the small-sized tape cassette 1. As shown also in FIG. 21, a driving gear 121 is provided on the lower side of the brake drum 114. The brake drum 114 is formed in one unified body with the supply-side reel mount 104 through a rotation shaft. A brake drum 143 provided for the large-sized tape cassette 2 has a driving gear 125 provided on its lower side as shown also in FIG. 21. The driving gear 125 is arranged to be rotatable on the chassis 146 below the brake drum 144.

The driving gears 121 and 125 are arranged to engage as shown in FIG. 21 with respect to height in the following manner: The driving gear 121 engages an idler gear 141 only when the small-sized tape cassette 1 is mounted on the VTR. The driving gear 121 constantly engages a connection gear 122 which is provided at the moving plate 106. The other driving gear 125 constantly engages a connection gear 124, and engages also the idler gear 141 only when the large-sized tape cassette is mounted. A connection gear 123 constantly engages the connection gear 124, and engages also the connection gear 122 only when the large-sized tape cassette is mounted.

The idler gear 141 is arranged on the shaft of a driving gear 140 to perform an osculating action according to the rotating direction of the driving gear 140 and is thus arranged to selectively give the driving force of the driving gear 140 either to the supply-side driving gear or to the takeup-side driving gear. This part of arrangement is similar to the first embodiment.

Further, in FIGS. 17 to 20, the illustrations further include tape guides 128, 129, 130 and 131, a rotary drum 132 on which a magnetic head is mounted, tape guides 133, 134 and 135, a capstan shaft 136, a pinch roller 137 and tape guides 138 and 139.

Next, a tape tension control action is described with reference to FIGS. 19 and 20. Before describing the tape tension control action, a tape transport action to be performed when the small-sized tape cassette 1 is mounted on the VTR is first described with reference to FIG. 19 as follows. The magnetic tape 3 is pulled out from the small-sized tape cassette 1 through the tension detecting guide 145, the guides 130, 131, 133, 134 and 138 and the pinch roller 137 which jointly form a tape path. More specifically, the magnetic tape 3 is pulled out from the supply reel disposed on the supply-side reel mount 104 and comes to abut on the tension detecting guide 145 through the tape guide 128. The tape 3 then comes to be wrapped around the rotary drum 132 through the tape guides 129, 130 and 131 for recording or reproduction. The tape 3 further comes to be pinched in between the capstan shaft 136 and the pinch roller 137. Under this condition, the tape 3 is transported at a predetermined speed by the capstan shaft 136 which is caused to rotate at a predetermined speed by a capstan motor. With the tape 3 thus transported, the tape 3 comes to be wound around the takeup reel which is disposed on the takeup-side reel mount 105. The takeup reel is rotated by the takeup-side reel mount 105 which is rotatively driven by the driving gear 140 through the idler gear 141. The magnetic tape 3 is gradually wound up in this manner. In the case of this (second) embodiment, the tension detecting guide 145 is arranged to abut on the magnetic tape 3 from inside the tape path.

Meanwhile, to the supply reel is applied a back torque corresponding to the tension of the brake band 113 wrapped around the brake drum 144 which is arranged below the supply-side reel mount 104 in one body with the latter. A predetermined amount of tension is imparted to the magnetic tape 3 by this back torque. The other brake band 112 which is wrapped around the other brake drum 143, on the other hand, is in a slack state as shown in FIG. 19. In other words, the brake band 112 has no tension. The system to which the brake band 112 belongs, therefore, generates no force and thus never affects the tape transport action which is performed with the small-sized tape cassette 1 mounted on the VTR.

The tape tension control action is described as follows. The tension of the magnetic tape 3 gives a clockwise turning moment to the tension arm 118 through the tension detecting guide 145 which abuts on the magnetic tape 3. The tension arm 118 receives also a counterclockwise moment from the spring 116 and a clockwise moment from the brake band 113. However, the brake band 112 has no tension as it is slack and not engaging the brake drum 143. Therefore, the balance of moments at the tension arm 118 is not affected at all by the brake band 112.

When the tape tension increases, the tension arm 118 comes to have a greater clockwise moment. Then, due to the balance of moments, the tension of the brake band 113 comes to decrease. Therefore, the back torque given to the supply-side reel mount 104 decreases to lower the tension of the tape pulled out from the supply reel.

In a case where the tape tension decreases, the clockwise moment of the tension arm 118 becomes smaller and, contrary to this, the tension of the brake band 113 increases. Therefore, the back torque applied to the supply-side reel mount 104 increases to cause the tension of the tape being pulled out from the supply reel to increase.

The operation of the embodiment to be performed when the large-sized tape cassette 2 is mounted is next described with reference to FIG. 20 as follows. The tape path formed in this case is approximately the same as the tape path formed when the small-sized tape cassette 1 is mounted. Therefore, the following description covers only the action of the tape tension control mechanism by omitting from description the tape transporting action to be performed in this case. Referring to FIG. 20, when the moving plate 106 moves to the reel position of the large-sized tape cassette 2, the brake drum 144 which is arranged nearly in one body with the supply-side reel mount 104 geometrically moves away from the brake band 113 to make the tension of the brake band 113 zero. The brake torque applied by the brake drum 144 then also becomes zero. Further, the moving plate 106 is arranged to turn when it receives the driving force of a gear 150 which engages a gear formed in a peripheral part of the support part 106a of the moving plate 106.

Meanwhile, the brake band 112 is pushed from its inner side by a brake band retaining pin 109 provided on the moving plate 106. The brake band 112 is thus wrapped around the brake drum 143 to generate a predetermined tension. A predetermined back torque is also generated by the brake drum 143. This back torque is transmitted via the connection gears 124, 123 and 122 to the brake drum 144, that is, to the supply-side reel mount 104.

In the arrangement described above, the tape tension control mechanism performs a control action as follows. The tape tension imparts a clockwise moment to the tension arm 118 through the tension detecting guide 145 which abuts on the magnetic tape 3. The tension arm 118 receives also a counterclockwise moment applied by the spring 116 and a clockwise moment by the brake band 112. However, the other brake band 113 has no tension because it is slack and not engaging the brake drum 144. The brake band 113, therefore, has no influence on the balance of moments at the tension arm 118.

When the tape tension increases, the clockwise moment of the tension arm 118 increases. Then, due to the balance among moments, the tension of the brake band 112 decreases. Therefore, the back torque transmitted to the supply-side reel mount 104 through the connection gears 124, 123 and 122 decreases to cause the tension of the tape pulled out from the supply reel to decrease.

In a case where the tape tension decreases on the other hand, the clockwise moment of the tension arm 118 decreases. Then, contrary to this, the tension of the brake band 112 increases. Therefore, the back torque transmitted through the connection gears 124, 123 and 122 to the supply-side reel mount 104 increases to cause the tension of the tape pulled out from the supply reel to increase.

The tape tension control mechanism of the second embodiment described above is arranged such that, among the basic parameters MS, LB, RD and LT included in the formula (3) mentioned in the foregoing, the parameters MS and RD vary according to the type or the size of the tape cassette mounted on the VTR. In other words, the tape tension control mechanism is characterized in that the diameter of the brake drum 143 which is provided for the large-sized tape cassette 2 is arranged to be about two times as large as that of the other brake drum 144 which is provided for the small-sized tape cassette 1. This arrangement enables the embodiment to keep at a low rate the changes taking place in tape tension T in relation to the changes of the tape coil radius R even in cases where the tape coil radius R greatly changes, as in the case of the large-sized tape cassette, by virtue of the large setting value of the basic parameter RD.

Further, in the case of the second embodiment, the support part 115 of the tension spring 116 is disposed on the moving plate 106. With the support part 115 arranged on the moving plate 106 in such a way as to keep unvarying the value of the tape tension T which is to be controlled according to the change of the parameter RD taking place when the large-sized tape cassette 2 or the small-sized tape cassette 1 is mounted, a tape tension can be adequately detected by just moving the moving plate 106 without recourse to a complex mechanism.

The second embodiment includes the driving gears 125 and 121 which are provided along with the brake drums 143 and 144 for the use of the large-sized and small-sized tape cassettes 2 and 1. These driving gears 125 and 121 are arranged to enable the idler gear 141 to operate without much varying the amount of its play according to the size of the tape cassette, so that change-over of arrangement for the small-sized or large-sized tape cassette can be accomplished within a short period of time.

While the described embodiments represent the preferred forms of this invention, this invention is not limited to the embodiments described. Various changes and modifications can be made without departing from the spirit and scope of the invention.

As described in the foregoing, the first embodiment of this invention is arranged to move the mechanical tape tension control mechanism in association with the moving action of the reel mounts arranged according to the distance between the reels of each of the tape cassettes of a plurality of types and to change the radius of swing of the tape tension detecting guide of the tape tension control mechanism from one value over to another according to the size of the tape cassette mounted. The arrangement is such that, when the large-sized tape cassette is mounted, the radius of swing of the tape tension detecting guide can be made to be larger than in the case of the small-sized tape cassette. This arrangement enables the tape tension control mechanism to stably operate without lowering its performance even in the event of the large-sized tape cassette.

In the case of the second embodiment, the radius of the brake drum of the reel braking means of the tape tension control mechanism is arranged to be increased in proportion to the distance between reels of each of the tape cassettes of a plurality of types. More specifically, one of a plurality of reel braking means corresponding to different distances between reels is selectively coupled to the reel mounts and the tape tension detecting means following the moving action of the reel mounts, so that the tape tension can be controlled with control parameters most apposite to each of the tape cassettes to be mounted on the apparatus.

What is claimed is:

1. A recording and/or reproducing apparatus arranged to permit each of a plurality of types of tape cassettes having different distances between reels to be selectively mounted on the apparatus by moving reel mounts with a reel mount moving mechanism and to allow a tape pulled out from the reels to travel while mechanically controlling the tension of the tape with a tape tension control mechanism in recording or reproducing information on or from the tape, comprising:

a) a plurality of reel mount braking devices respectively provided for the plurality of types of tape cassettes, at least one of the braking devices being supported for translation relative to another of the braking devices, said plurality of reel mount braking devices including a plurality of brake drums that are arranged respectively for the plurality of types of tape cassettes and the respective radii of said brake drums being arranged to be larger in proportion to the distances between the reels of the plurality of types of tape cassettes; and b) coupling means for selectively coupling one of said plurality of reel mount braking devices to the reel mount and tape tension detecting means according to the type of the tape cassette mounted on the apparatus.

2. An apparatus according to claim 1, wherein each of two types of tape cassettes having different distances between reels is selectively mountable on the apparatus.

3. An apparatus according to claim 1, wherein said reel mount moving mechanism includes said coupling means.

4. An apparatus according to claim 1 wherein said tape tension detecting means includes a detecting guide which is arranged to abut on the tape.

5. An apparatus according to claim 4, wherein said detecting guide is arranged to abut on the tape from inside a tape path.

6. A recording and/or reproducing apparatus comprising:

(a) support means operable for receiving feed and takeup reels of respective differently-sized tape cassettes;

(b) a tape tension control mechanism inclusive of a tape tension sensor and a plurality of mutually different and mutually translatable braking devices, each operable for braking a cassette reel received by said support means, said braking devices including a plurality of brake drums that are arranged respectively for the differently-sized tape cassettes and the respective radii of said brake drums being arranged to be larger in proportion to the distances between the reels of the differently-sized tape cassettes; and (c) means for selectively operating said braking devices correspondingly with the size of the tape cassette reel received by said support means.

7. A recording and/or reproducing apparatus arranged to permit each of a plurality of types of tape cassettes having different distances between reels to be selectively mounted on the apparatus by moving reel mounts with a reel mount moving mechanism and to allow a tape pulled out from the reels to travel while mechanically controlling the tension of the tape with a tape tension control mechanism in recording or reproducing information on or from the tape, comprising:

(a) a plurality of reel mount braking devices and tape tension detecting means both composing the tape tension control mechanism, said reel mount braking devices being provided in a plural number for one of reels corresponding to the plurality of types of tape cassettes, said reel mount braking devices controlling the tension of the tape pulled out from the reel in cooperation with the tape tension control mechanism and including a plurality of brake drums that are arranged respectively for the plurality of types of tape cassettes and the respective radii of said brake drums are arranged to be larger in proportion to the distances between the reels of the plurality of types of tape cassettes; and b) coupling means for selectively coupling one of said plurality of reel mount braking devices to the reel mount and to said tape tension detecting means according to the type of the tape cassette mounted on the apparatus.

* * * * *